United States Patent [19]

Powell et al.

[11] Patent Number: 4,873,643
[45] Date of Patent: Oct. 10, 1989

[54] INTERACTIVE DESIGN TERMINAL FOR CUSTOM IMPRINTED ARTICLES

[75] Inventors: Kenneth A. Powell, Ann Arbor, Mich.; Andrew S. Crawford, 523 Sunset, Ann Arbor, Mich. 48103

[73] Assignee: Andrew S. Crawford, Ann Arbor, Mich.

[21] Appl. No.: 111,412

[22] Filed: Oct. 22, 1987

[51] Int. Cl.$^4$ .............................................. G06F 15/46
[52] U.S. Cl. ..................................... 364/468; 364/188; 364/192; 364/470; 364/521
[58] Field of Search ................... 364/468, 470, 474.24, 364/188, 189, 191–193, 514, 518, 519, 521, 513, 900 MS File; 340/723, 724

[56] References Cited

U.S. PATENT DOCUMENTS

| | | | |
|---|---|---|---|
| 4,275,449 | 6/1981 | Aish | 364/900 X |
| 4,546,434 | 10/1985 | Gioello | 364/192 X |
| 4,598,376 | 7/1986 | Burton et al. | 364/192 X |
| 4,700,317 | 10/1987 | Watanabe et al. | 364/512 X |
| 4,700,318 | 10/1987 | Ockman | 364/188 X |
| 4,736,306 | 4/1988 | Christensen et al. | 364/191 X |

Primary Examiner—Joseph Ruggiero
Attorney, Agent, or Firm—Krass & Young

[57] ABSTRACT

The present invention is an interactive design terminal for custom imprinted articles. A memory stores a plurality of print design elements and a set of design rules for combination of the design elements in accordance with selections made by an operator. The interactive design terminal presents an ordered sequence of print design choices to the operator via a video display and perferably stores the results of the operator selections. The interactive design terminal provides a display of the operator selections, preferably in a graphics display of a depiction of the resulting imprinted article, and detects conflicts between operator selections.

18 Claims, 7 Drawing Sheets

INTERACTIVE DESIGN TERMINAL FOR CUSTOM IMPRINTED ARTICLES

FIELD OF THE INVENTION

The technical field of the present invention is that of interactive computer terminals and most particularly interactive computer terminals used to specify the design of a custom imprinted article.

BACKGROUND OF THE INVENTION

Imprinting sportswear has become common since World War II and has had explosive growth since the middle 1970's. Four types of design have had the most appeal: product-oriented; entertainment-oriented such as rock groups, sports teams and cartoon characters; local organizations such as softball teams, schools and clubs; and special events such as runs, special weekends and picnics. The last two types form the basis of custom garment imprinting.

A custom imprinted garment, such as a T-shirt is like a personal billboard. People can tell the world about some part of their interests. Such custom imprinted garments can enhance a person's identity and pride. In any college town there will be hundreds of unique T-shirts expressing all sorts of events, groups and interests. These T-shirts can influence how a person feels about himself as well as how the world reacts to him. Custom imprinted garments such as T-shirts are not part of the mass-marketed, branded products that the world is used to buying. Currently, custom imprinted garments such as T-shirts are made on a local basis by thousands of small shops who sell directly to the public out of their factories. The design process for such custom imprinted garments requires a great deal of skill. Either the customer himself must supply the skill or the retail store must employ a well-trained sales clerk. There are many design decisions that must be made in order to produce a custom imprinted garment and this choice process is typically not very well structured to enable the customer to make his design easily. Currently, because of this difficulty in specifying the design of a custom imprinted garment, there is little awareness of the availability and cost of such garments. Currently it is too expensive to order small quantities of custom imprinted garments. The typical sports equipment retail store would not employ such trained clerks and thus cannot sell such custom imprinted garments.

There is therefore a need to provide some manner for a customer to easily specify the design of a custom imprinted article in a manner in which the user can be easily led through the number of choices required and in a manner in which the production of a small number of custom imprinted garments is economical.

Similarly, a need exists for a customer to easily specify the design of other types of custom imprinted articles such as hats, notebook covers, signs, bumper stickers, umbrellas, cloth or canvas items, cups, coffee mugs, certificates, key chains, balloons, buttons, or business cards, among other custom designed items.

SUMMARY OF THE INVENTION

The present invention is in the field of interactive video display design terminals for specification of the design of custom imprinted articles. In accordance with the preferred embodiment of the present invention, this interactive design terminal is configured in a stand-alone desktop computer or the equivalent. This design will typically include a central processing unit, an amount of read-only memory and random access memory together with a video display and a manual input device. In accordance with the preferred embodiment of the present invention, the manual input device is a video touch screen. However, it is contemplated that the present invention could use a keyboard or a mouse pointing device either in conjunction with or in place of the touch screen.

The basic configuration of the interactive design terminal includes a design element memory which has stored therein data which represents a plurality of print design elements. A design rules memory has stored therein a plurality of design rules regarding the placement and size of the plural print design elements and the placement and size of text to accompany the print design elements. The video display device presents a variety of choices to the user in a predetermined order to enable ease of selection. The user employs the input device to specify the particular choice and to make other selections within the interactive design terminal. By this means, the operator is able to select and edit the type and size of article to be imprinted, the particular design elements to be employed, and to specify the location, layout, and characters of any accompanying text. The interactive design terminal further includes an order memory for storing data indicative of the selection relating to the custom imprinted article.

This technique reduces or eliminates the need for a trained sales clerk to assist the customer in making the choices for the type and design of the custom imprinted articles. In particular, this enables the selection of a design assembled from existing parts without the need for the customer or the vendor to generate new creative art. In addition, the particular data stored in the order memory is then employed in the production of the custom imprinted article.

It is contemplated also that more complex configurations of the design system would assist a sales clerk possessing limited design knowledge with the preparation of designs for custom imprinted articles.

In accordance with the preferred embodiments, the custom imprinted article of this invention is a sportswear article such as a T-shirt. Among the choices for the location of the print design element in accordance with the preferred embodiment of the present invention is a full front position, a front heart position, and a full back position. In accordance with the preferred embodiment, the accompanying text may be either in one or more lines curved around the print design element, one or more lines disposed generally horizontally either above or below the print design element, or one or more lines slanted across the print design element or in place of it.

BRIEF DESCRIPTION OF THE DRAWINGS

These and other aspects of the present invention will be described below in conjunction with the figures in which.

DETAILED DESCRIPTION OF THE PREFERRED EMBODIMENT

Figure 1:
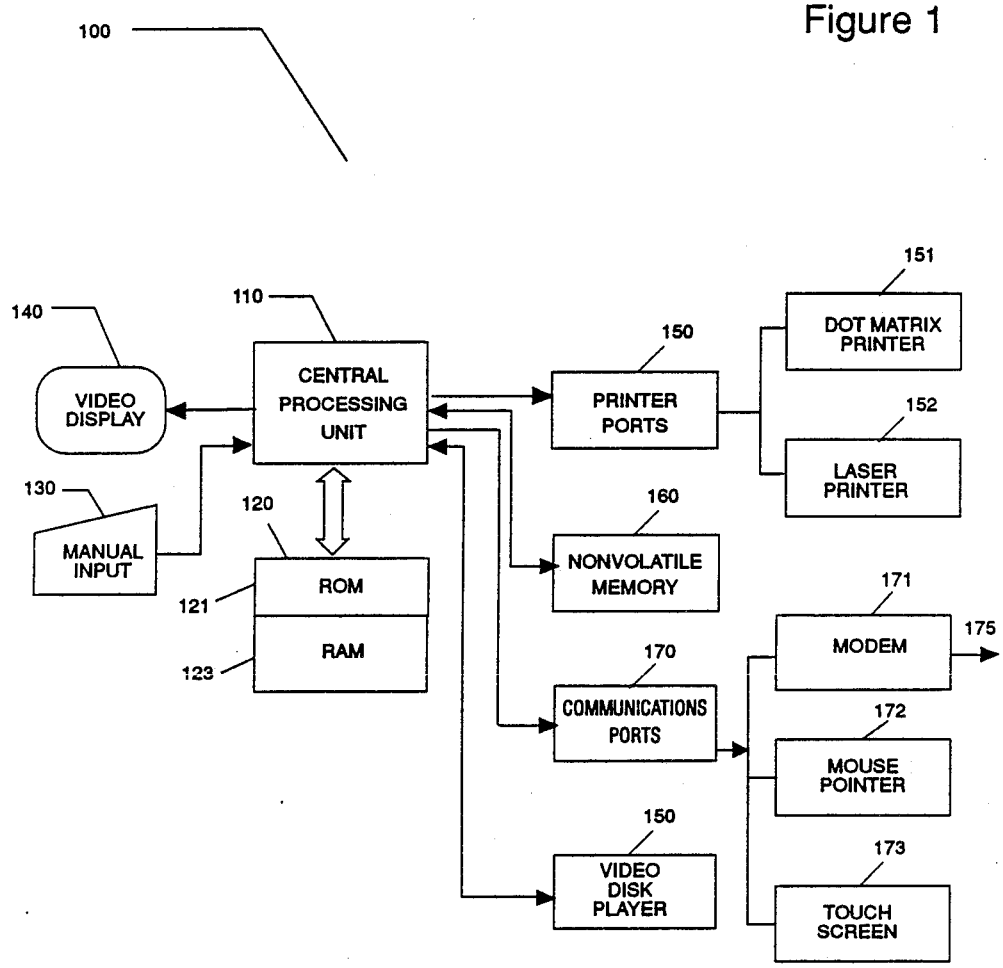
FIG. 1 illustrates the basic block diagram of the interactive terminal device in accordance with the present invention.

FIG. 1 illustrates the interactive design terminal in accordance with the present invention in block diagram form. Interactive design terminal 100 includes central processing unit 110, memory 120 including read-only memory 121 and random access memory 123, manual input device 130, video display device 140, printer port 150 along with dot matrix impact printer 151 or laser printer 152, non-volatile memory 160, and communications ports 170 along with modem 171 and mouse pointing device 172 or touch screen device 173. An alternative embodiment would include video disk player 180. Together these parts form a device of the same computing power and capability as a desktop personal computer. In the preferred embodiment, interactive design terminal 100 comprises such a desktop personal computer properly programmed in accordance with the principles of the present invention which will be more fully disclosed below.

Central processing unit 100 is the main operating portion of interactive design terminal 100. Central processing unit 110 operates on a program stored in memory unit 120, either in read-only memory 121 or in random access memory 123, or both, and causes the proper interaction between manual input device 130, video display 140, printer port 150, non-volatile memory 160, communications port 170 and video disk player 180. Manual inputs to the interactive design terminal 100 are applied via manual input device 130, or communication port 170, or both. In a typical desktop personal computer which could embody this interactive design terminal 100, manual input device 130 would consist of a manually actuable keyboard. It is considered advantageous in the present invention to embody in place of or in addition to manual input device 130 a touch screen device 173 or mouse pointing device 172 for video display 140. In such an event, the user merely touches the screen (or clicks the mouse button in case of the mouse pointing device) of video display 140 at particular locations indicated by the output upon video display 140. Central processing unit 110 is responsive to the manual input signals from manual input device 130 in order to respond to input commands and selections made by the operator.

Central processing unit 110 also includes means for control of video display 140. Video display 140 is employed to communicate the state of interactive design terminal 100 to the user. Central processing unit 110 generates the desired text and graphics to be presented to the user and causes them to be displayed on video display 140.

Central processing unit 110 is bidirectionally coupled to non-volatile memory 160. Non-volatile memory 160 is some means for storing data which is not dependent upon power being supplied to interactive design terminal 100. In the preferred embodiment, non volatile memory 160 includes a so-called floppy disk drive or a winchester disk drive. Under control of central processing unit 110, data and programs may be stored in the memory of non-volatile memory 160, and recalled at the desired times. In particular, it is contemplated that the program for control of interactive design terminal 100 will be entered into the system via non-volatile memory 160. In order to use this program, central processing unit 110 will transfer the program from non-volatile memory 160 to random access memory 123. Thereafter, central processing unit 100 will be controlled by this program within random access memory 123. In addition, it is contemplated that a predetermined set of design elements employed in the design to be assembled via interactive design terminal 100 are stored within non-volatile memory 160.

Central processing unit 110 is further coupled to a printer port 150. In accordance with the principles of the present invention, printer 151 is employed to print out either an order form which enables the user of the system to place an order, or a sign-up sheet which allows the user of the system to take orders from persons who may wish to order imprinted articles, such as members of a team or a group. In accordance with an alternative embodiment of the present invention, laser printer 152 is employed to provide a high quality print out of the selected design to enable construction of the silk screen for imprinting the garment.

Central processing unit 110 is connected to communications port 170. Central processing unit 110 generates data corresponding to a design selected by a user of the interactive design terminal 100 and transmits this data to another system via communications port 170. Communications port 170 is connected to communications line 175 which is further connected to the other system. In the preferred embodiment, communications port 170 comprises an RS232 port connected to a modem 171 which is further connected to the telephone system. Central processing unit 110 may transmit data to another system by properly encoding it through communications port 170 and transmitting it via communications line 175. The present invention may alternately employ either mouse pointer device 172 or touch screen 173 in addition to manual input device 130. In accordance with principles known in the art, mouse pointer device 172 controls the location of a cursor displayed on video display 140. Actuation of a push button switch on the mouse causes a central processing unit 110 to perform a function corresponding to the location of the cursor. Alternately, touch screen 173 causes central processing unit 110 to perform a function corresponding to a location touched on the screen of video display 140.

Central processing unit 110 is connected to a non-volatile memory 160. Non-volatile memory 160 is employed to store the program to control central processing unit 110 and one or more predetermined video displays which are to be presented to the user via video display 140. These may include demonstrations of the available types of articles to be imprinted, or it may include a tutorial on how to operate the interactive design terminal 100. Non-volatile memory 160 also is employed to store customer use and order information.

In an alternative embodiment, central processing unit 110 is connected to a video disk player 180. Video disk player 180 is employed to store one or more predetermined video displays which are to be presented to the user via video display 140. These may include demonstrations of the type of articles to be imprinted which are available, or it may include a tutorial on how to operate the interactive design terminal 100.

Figure 2:
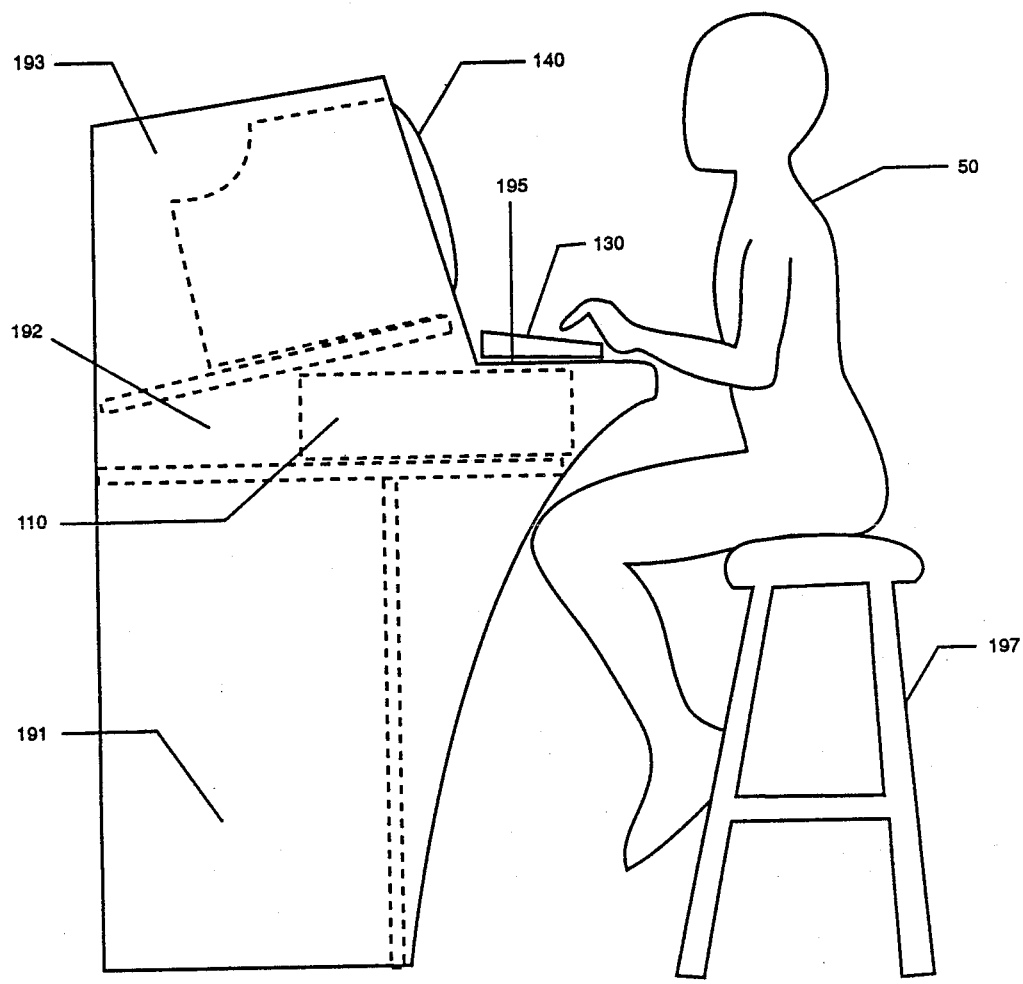
FIG. 2 illustrates the design of the user kiosk employed with the interactive design terminal of the present invention.

FIG. 2 illustrates kiosk 190 employed to house interactive design terminal 100 for use by user 50. Kiosk 190 includes base 191 for support of the various components. Compartment 192 of kiosk 190 includes space for housing the major components of interactive terminal 100 except for manual input device 130 in the form of a keyboard and video display 140. A shelf 195 above compartment 192 provides a place to dispose manual input device 130. Compartment 193 includes space for housing video display 140 in an orientation convenient for viewing by the operator 50. In operation user 50 sits on stool 197, which positions user 50 at the proper location for use of manual input device 130 and video display 140.

Figure 3A:
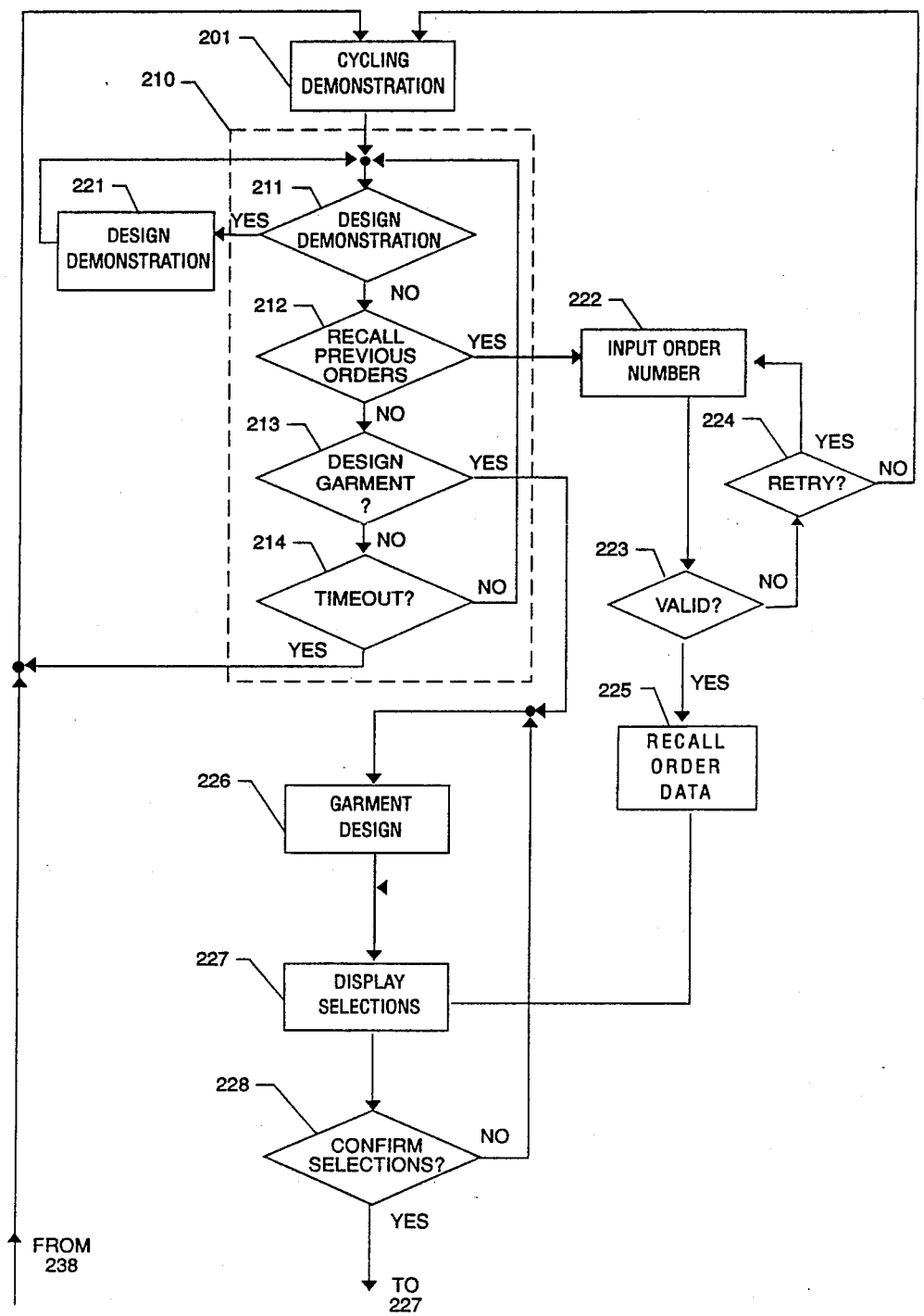
FIGS. 3a, 3b and 3c illustrate a flow chart of the basic interactive terminal program in accordance with the present invention.
Figure 3B:
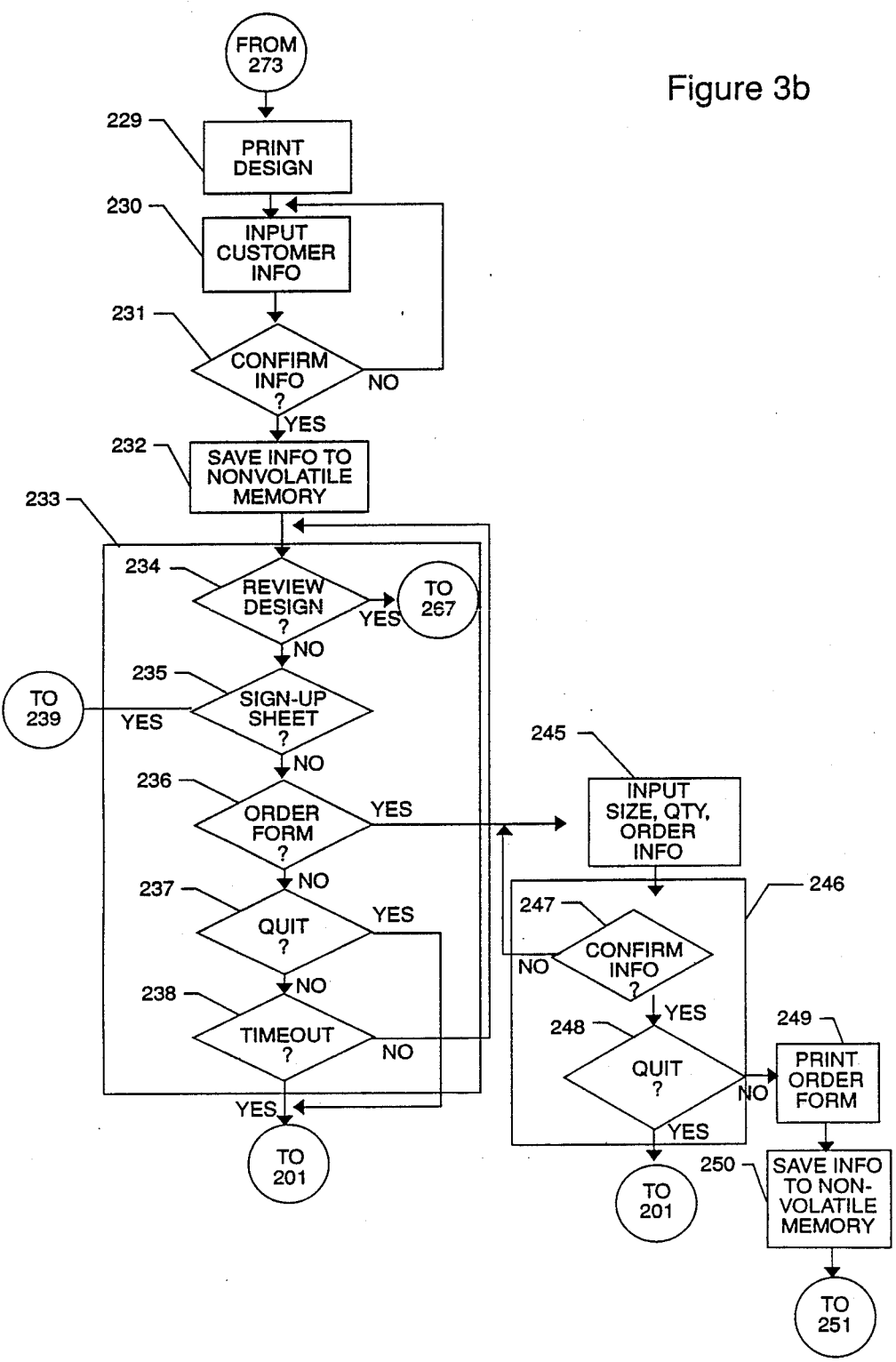
Figure 3C:
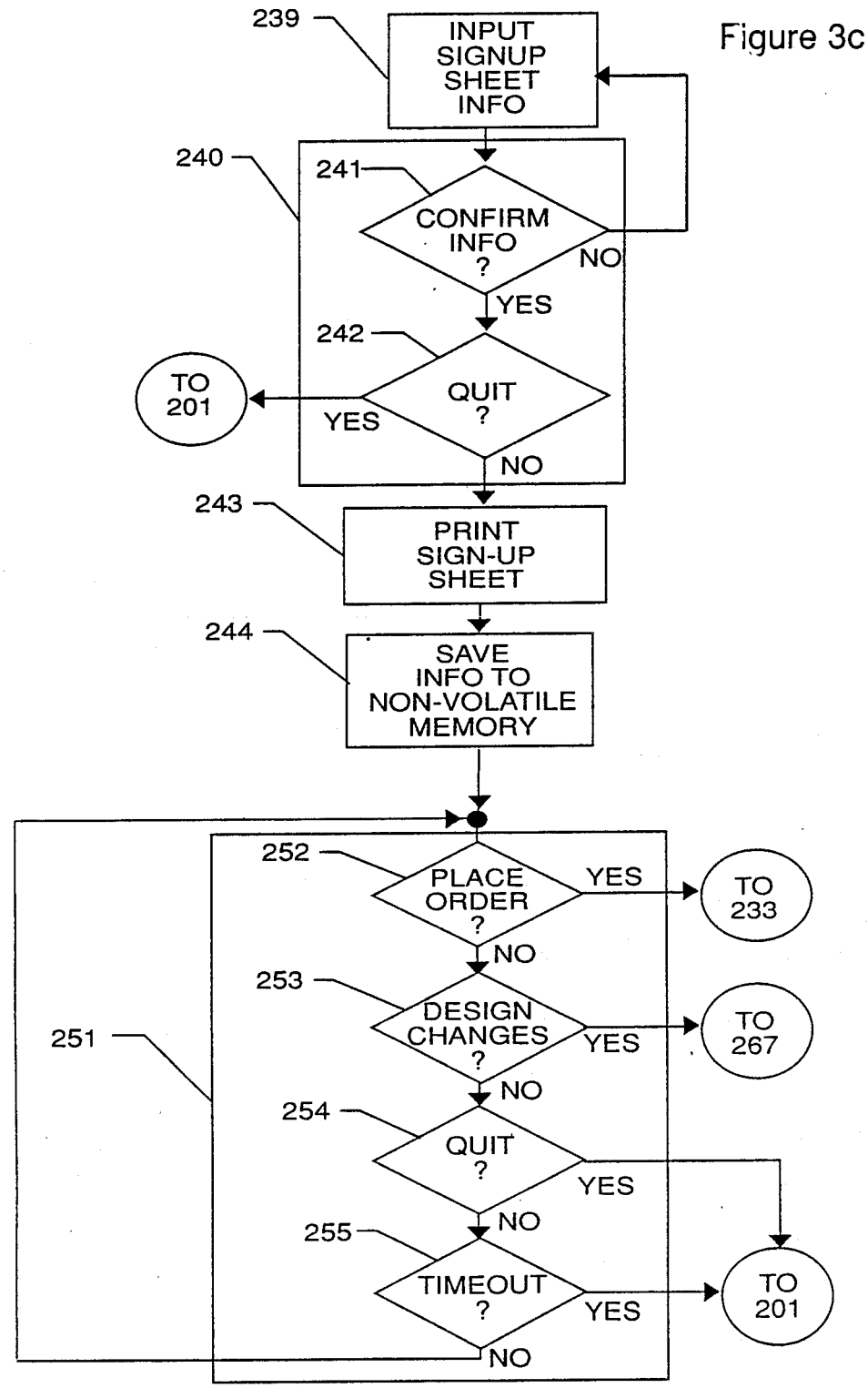

FIGS. 3a, 3b and 3c illustrate in flow chart form, the program employed to control interactive design terminal 100 in order to provide the process of the present invention. Program 200 illustrated in FIG. 3 is intended to demonstrate only the general overall outline of the program and not the exact details. Those skilled in the art would be able to complete the design of program 200 required for control of interactive design terminal 100 by providing the proper design choices necessary to fill in the details of the flow chart illustrated in FIGS. 3a, 3b and 3c.

Program 200 begins with a cycling demonstration. In the preferred embodiment of the present invention, interactive design terminal 100 is operated as a stand alone device in a retail store. As such, interactive design terminal 100 must provide some means to attract the customer or potential customer to the terminal. This attraction is provided by the cycling demonstration illustrated in processing block 201. In accordance with the preferred embodiment of the present invention, central processing unit 110 controls non-volatile memory 160 to provide a demonstration of the operation and capabilities of interactive design terminal 100. It is envisioned that this demonstration would include illustration of the types of imprinted articles. In accordance with the preferred embodiment of the present invention, the imprinted articles are garments such as caps, T-shirts, baseball shirts or the like. The non-volatile memory 160 could include stored video images of such imprinted garments as well as the types of imprinting that can be put on these garments. Central processing unit 110 controls non-volatile memory 160 to present this demonstration through video display 140. Alternatively this cycling demonstration may be stored in video disk player 180 for display via video display 140 under the control of central processing unit 110.

After completing cycling demonstration 201, program 200 provides menu selection 210. Menu selection 210 enables a number of selections by the user to proceed with the other aspects of the program. Although menu selection 210 is shown as a series of yes/no decisions, it is typical in such a case to provide a set of menu selections. This menu selection could be made via alphabetic (A,B,C . . . ) or numeric (1,2,3 . . . ) keys of manual input device 130 corresponding to the desired option. Alternately this menu selection could be made via mouse pointer device 172 by moving the cursor to a location corresponding to the desired option and actuation of a push button on the mouse pointer device 172. A further alternative is to enable menu selection via a plurality of touch screen locations, the selection of any one of which may be made by touching the particular location. Each of these methods is known in the art. In any event, menu selection 210 includes selection of a design demonstration, selection of the recall of a previous order or the selection of a generation of a new garment design.

Menu selection 210 enables the user to select a design demonstration (decision block 211). If the user has selected such a design demonstration, then a design demonstration is presented to the user via video display 140 (processing block 221). This could be in the form of a more detailed presentation on the operation of interactive design terminal 110 stored in non-volatile memory 160 and presented to the video display via central processing unit 110, or it could take the form of a video demonstration stored on video disk player 180 whereby central processing unit 110 presents the design demonstration on video display 140. In either event, the design demonstration takes place under the control of central processing unit 110. Once this design demonstration is complete, program 200 returns to menu selection 210 to permit the user to select one of the predetermined choices.

Menu selection 210 also includes a selection to recall a previous order (decision block 212). As will be further explained below, a partially or completely specified imprint design can be stored in the non-volatile memory 160 of interactive design terminal 100 and recalled for later use or modification. If the operator selects the recall of a previous order, then the operator is prompted to input the order number (processing block 222). If the order number is valid according to decision block 223, then the order data is recalled from non-volatile memory 160 (processing block 225). Control of program 200 then skips ahead to display the selections (processing block 227). The operation of this block will be further detailed below. If the order number is invalid according to decision block 223, then the operator is presented with the option either to retry entry of a valid order number, whereby control returns to processing block 222, or to abort the operation, whereby control returns to the cycling demonstration illustrated in processing block 201 (decision block 224).

Menu selection 210 also enables the user to select the portion of the program 200 which enables garment design (decision block 213). If the operator makes this selection, then control of program 200 passes to processing block 226 which is a subroutine for garment design. Processing block 226 which enables specification of the artwork design will be more fully described below in conjunction with FIGS. 5a, 5b, 5c and 5d.

Figure 4:
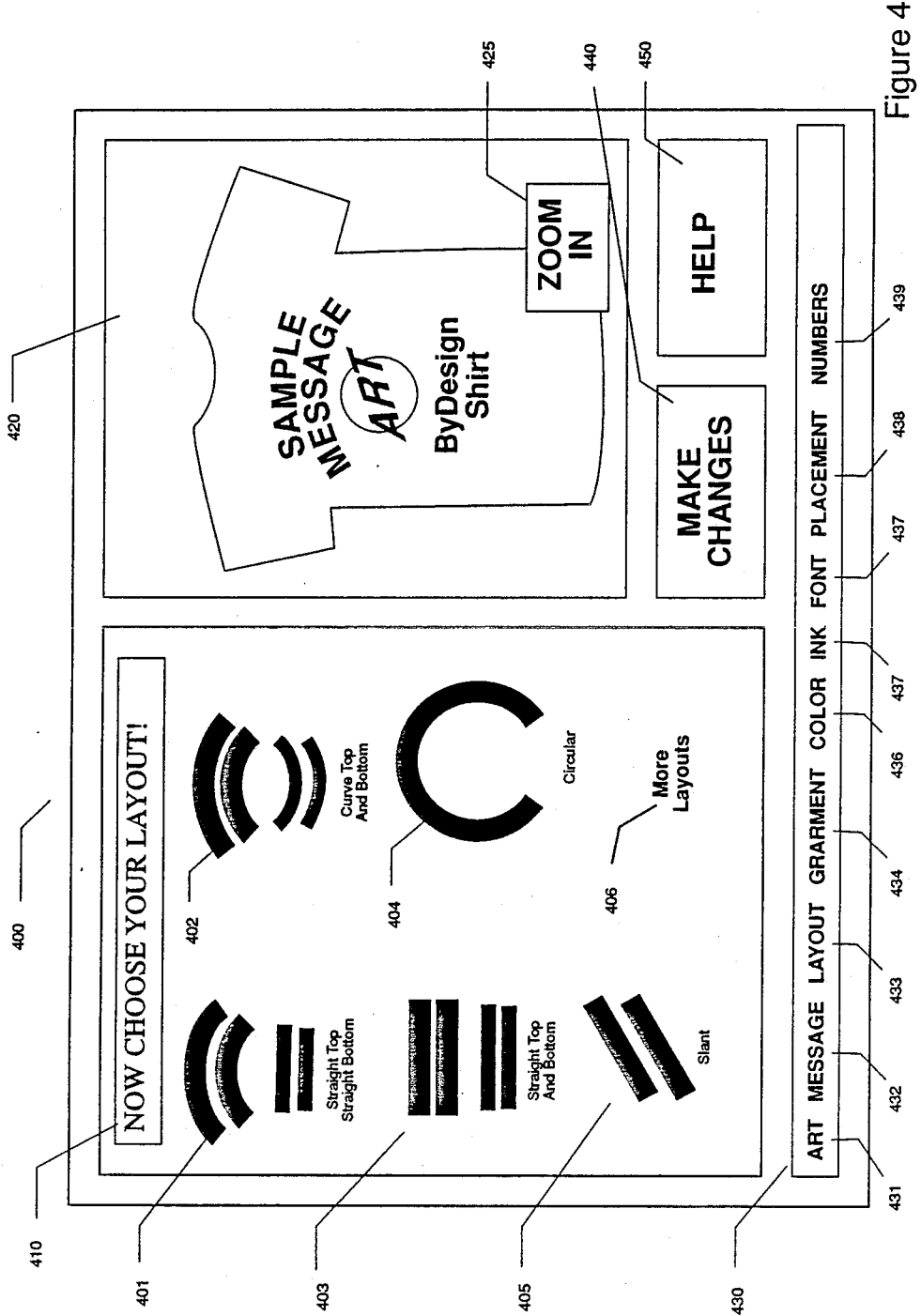
FIG. 4 is an illustration of the display on the video display screen for menu specification of the placement of text lines in accordance with the preferred embodiment of the present invention.

The layout of a typical menu selection display which appears on video display 140 is illustrated in FIG. 4. Menu selection display 400 includes a primary option selection area 410 which includes a plurality of selection areas 401 to 406. Each of these selection areas illustrates a permitted option for the particular menu. In the example illustrated in FIG. 4, the selections are of arrangements of text lines. Note selection area 406 includes the message "More Layout." Selection of this element of the menu enables the display of additional permitted options for the particular item being specified. Primary option selection area 410 may have more or fewer options than the six illustrated in FIG. 4. The limit on the number of selections available is the available area for illustration of the particular option and the minimum area necessary for consistent unambiguous resolution of the selection. It is contemplated in the preferred embodiment that the selections be made via a touch screen, which would require a minimum area for resolution somewhat larger than the typical operator's fingertip.

Menu selection display 400 includes design illustration area 420. Design illustration area 420 is employed to provide an illustration of the prior design selection. In accordance with the preferred embodiment this illustration includes an illustration of the type of garment selected, the color of the garment, the particular art element selected with the accompanying text in its selected location, the ink color selected, the selected font for the text, the placement of the selected design on the garment and any specified numbers in the design. The purpose of design illustration area 420 is to show the user the appearance of the imprinted garment as best as can be illustrated by interactive design terminal 100. Zoom selection area 425 is employed to enable a more detailed illustration of the selected art element. Selection of the zoom function by touching zoom selection area 425 enables recall of data for a more detailed view of the design element from non-volatile memory 160. In the preferred embodiment design illustration area 420 merely provides an illustration in rough terms to enable a view of the entire imprinted article. A more detailed view of the specified art element would be enabled via the zoom function.

Menu selection display 400 includes a status bar 430. Status bar 430 includes a plurality of status elements 431 to 439. These status elements illustrate the present state of the garment design subroutine 226. The status elements include art status element 431, message status element 432, layout status element 433, garment status element 434, color status element 435, ink color status element 436, font status element 437, placement status element 438 and number option status element 439. In accordance with the preferred embodiment the current menu is illustrated by providing a differing color for the corresponding status element. Thus in FIG. 4 layout status element 433 is illustrated as having a different color from the rest of status bar 430.

In accordance with the preferred embodiment make changes area 440 enables a global function selection. Program 200 enables ordinary selection of the options of a particular garment design in a predetermined order. Touching of make changes area 440 changes menu selection display 400 to permit selection of any of the design selection menus represented by the status elements 431 to 439, which would appear in primary option selection area 410. When selected the corresponding menu selection display 400 would be displayed, enabling the operator to change the prior selection or confirm it.

Lastly, menu selection display 400 includes help selection area 450. Touching help selection area 450 enables the display of a help menu. This help menu is preferably context selective, that is the menu displayed depends on the current status within program 200.

FIGS. 5a, 5b, 5c and 5d illustrate a subroutine for embodying processing block 226 which specifies the garment design. Subroutine 226 is begun at begin block 301. Central processing unit 110 first presents the operator with a number of choices for the graphic design element (processing block 302). The operator is prompted to select the particular art to be imprinted (processing block 303). In accordance with the preferred embodiment as noted above, this selection process is made by selecting from a set of menus a particular category and then perhaps a subcategory and finally the specific design. It is contemplated in the preferred embodiment that selection of the category, subcategory and specific design will be made via a plurality of menu screens such as illustrated in FIG. 4. It is contemplated that the data on the specifications of each design will be stored within non-volatile memory 160. It is also anticipated that central processing unit 110 will recall this design pattern from non-volatile memory 160 and display it to the user via video display 140. This the user is able to see the proposed design or design elements in order to aid in his selection. It is considered particularly advantageous to enable the user to view selections of particular imprint designs before making the selection.

Figure 10:
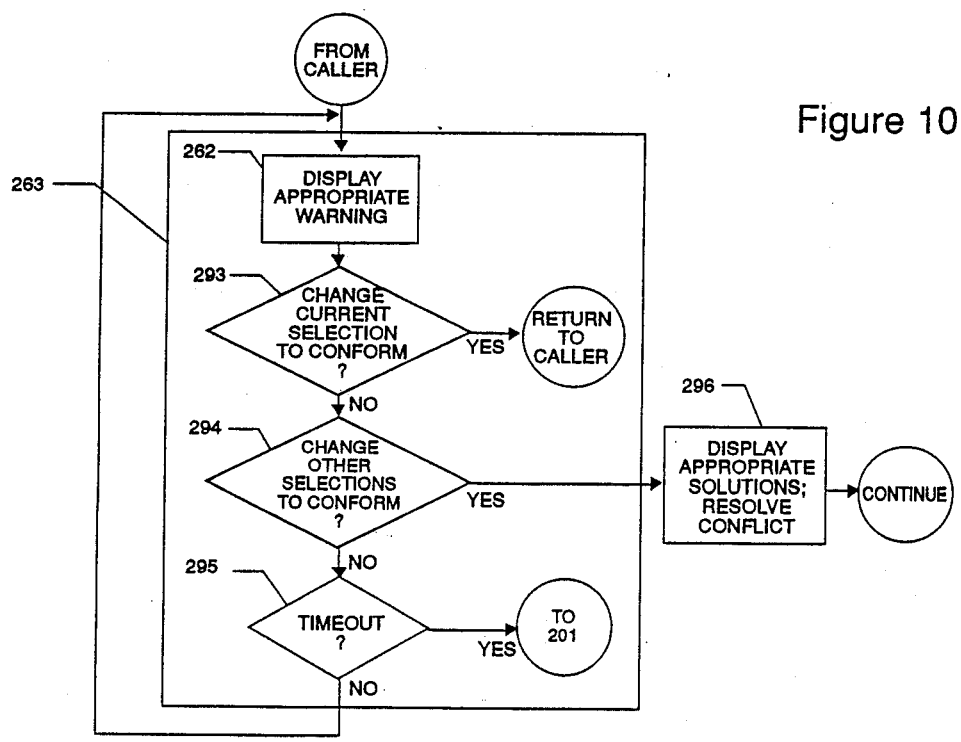
FIG. 10 is a flow chart illustrating the conflict resolution subroutine.

According to decision block 304, if the operator selects one of the above specified primary options, then control passes to the conflict decision block 305 where the selection is tested according to a predetermined set of design rules stored in non-volatile memory 160 that embody valid and aesthetically pleasing design descriptions. If the current selection is found to conflict with previous selections that the operator has made then control passes to processing block 291 where an appropriate warning is displayed. Several options are then presented to the user according to menu selection 292 (FIG. 10). If the operator selects changing the current selection to conform with other previous selections according to decision block 293, then control returns to the local caller, in this case processing block 303. If the operator instead wishes to modify other selections to conform to the current selection, then control passes to processing block 296 where appropriate solutions stored in non-volatile memory 160 are displayed on video display unit 140 that present the operator with alternatives to solve the conflict. If the resolution of the conflict according to the design rules involves the display of one or more of the menu blocks 302, 307, 312, 317, 322, 327, 333, 338, or 344, then the appropriate menu blocks are displayed using programming technique that sets up a simple queue of the specified menu blocks, which are executed in order. When the queue no longer contains menu blocks to be executed, the program continues by returning to the menu block that called conflict resolution menu 292, in this case menu block 302. If resolution of the conflict does not involve the display of any of the specified menu blocks in processing block 296, then the program continues by returning to the menu block that called conflict resolution menu 292, in this case menu block 302. If the operator has not acted in a predetermined amount of time to select from decision blocks 293 or 294 in menu 292, then according to decision block 295 control returns to the cycling demonstration illustrated in processing block 201.

Once the conflict has been resolved to the satisfaction of the conflict resolution rules in decision block 305, processing block 306 uses the previously chosen selections along with suggested selections for selections not yet chosen and, in accordance with the design rules stored in random access memory 123, creates a rendering of the design on video display device 140 for viewing in primary option selection area 410. This display of the design for viewing is advantageous in that it reassures the operator that his/her selections combine to produce a pleasing design, provides at a quick glance an overview of selections made, and offers feedback in general that is necessary in the process of creating a desirable design that often times requires several revisions. No response is required from the user at this point, and control immediately passes to the next menu block, menu selection 307 in the preferred embodiment.

Figure 6:
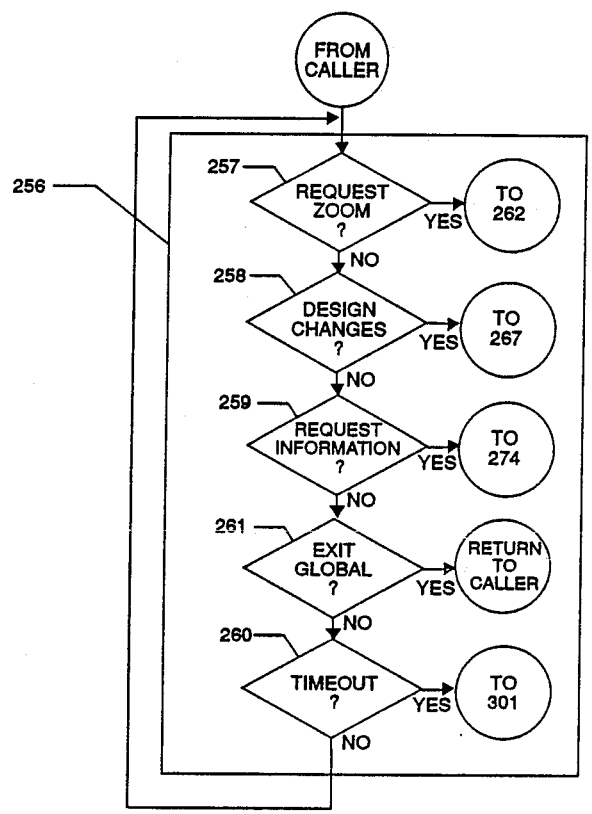
FIG. 6 is a flow chart illustrating the global function selection subroutine.

On the other hand, if the operator does not select one of the primary options in decision block 304, but instead selects one of the so-called global options, then control passes to menu block 256 (FIG. 6). The global options include enlarging the artwork for viewing (decision block 257), requesting the opportunity to modify previous design selections (decision block 258), requesting information (decision block 259), or returning to menu block 302. Each of these alternatives, to be described below, offer the operator more detailed information about the design process.

Figure 7:
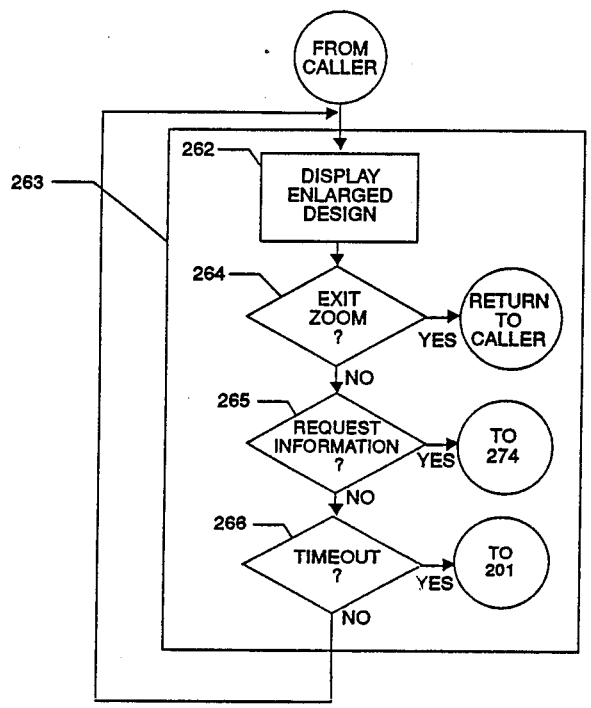
FIG. 7 is a flow chart illustrating the zoom subroutine.
Figure 9:
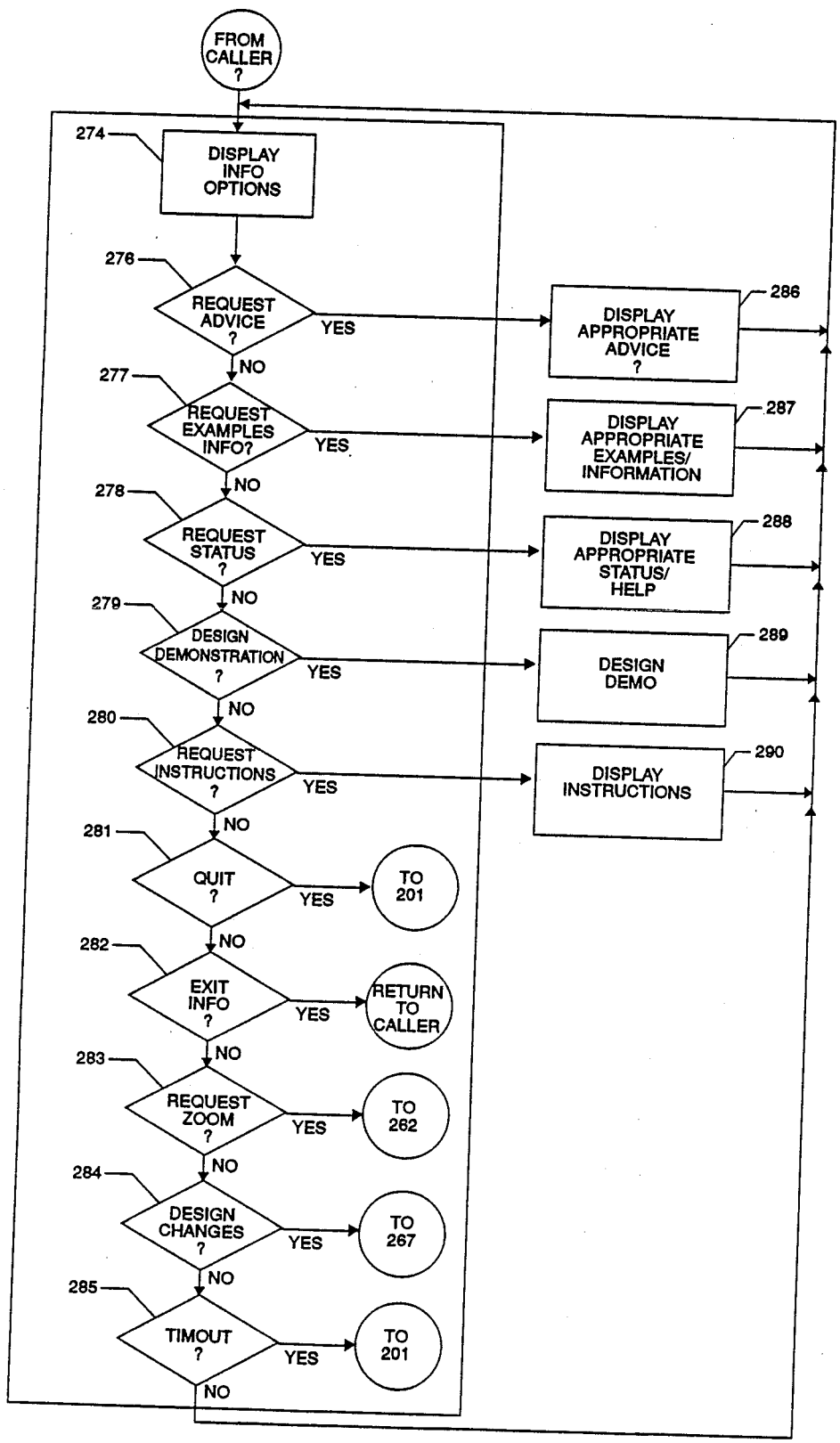
FIG. 9 is a flow chart illustrating the request information subroutine.

According to menu block 256, the operator may request that the design be "zoomed up" for viewing in decision block 257. Control then passes to processing block 262 (FIG. 7) in which video display unit 140 displays an enlarged view of the artwork. The display also includes menu block 263 that allows the operator to exit the zoom mode (decision block 264), or request information about the design (decision block 265). If the operator selects to exit the zoom mode according to decision block 264, control passes back to the local caller, in this case menu block 256. If the operator does not select to exit but instead requests information according to decision block 265, then control passes to processing block 274 (FIG. 9) where the operator further specifies the type of information desired, as described further below. If the operator has not selected either of the options in decision blocks 264 or 265, then after a specified time-out period (decision block 266) control returns to the cycling demonstration in processing block 201.

Figure 8:
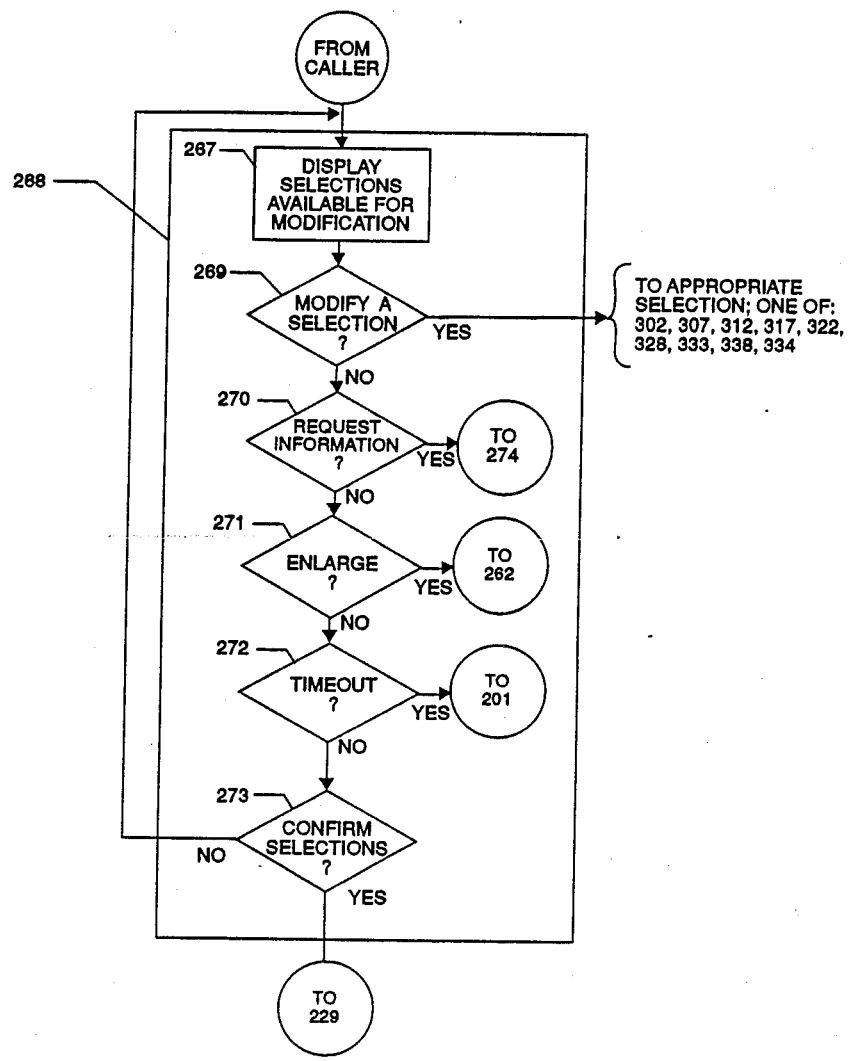
FIG. 8 is a flow chart illustrating the design change subroutine.

Alternatively, if the user requests the opportunity to make design changes according to decision block 258 in menu block 256, then control passes to processing block 267 (FIG. 8) where all selections available for modification are presented to the user. These typically will include previous selections the user has made in menu blocks 302, 307, 312, 317, 322, 327, 333, 338 or 344. The user then may proceed according to menu block 268 and select one of the following: choose a selection to change (decision block 269), request information (decision block 270), or request a zoomed up display of the artwork design for viewing (decision block 271). If the user chooses one of the selections to change the design according to decision block 269, then control passes to the appropriate menu block from the list of selections available for modification listed in processing block 267 described above. The above action is illustrated using the flow diagram, but it should be noted that the actual programming technique involves the use of a queue to keep track of actions to be taken during program execution. At any rate, once the temporary instructions in the queue have been executed and the queue is again empty, control returns to the caller, in this case menu block 302.

Rather than choosing a selection to modify in menu block 268, the user may request information in decision block 270, whereby control passes to processing block 274 (FIG. 9), which will be described below, or the user may request the artwork to be zoomed up in decision block 271, whereby control passes to processing block 262, which has already been described above. If the user fails to respond to any selection in menu block 268 during a specified time-out period (decision block 272), then control passes to the cycling demonstration in processing block 201.

The user may also request information in menu block 256 according to decision block 259. In this case control passes to processing block 274 (FIG. 9) where several types of information, instruction and help are available. These options are displayed on video display unit 140 and the user is prompted to make a selection according to menu block 275. In general, the user may select one of the following: design advice (decision block 276), design examples and general information (decision block 277), current status of the design process (decision block 278), a design demonstration (decision block 279), instructions (decision block 280), quit the program (decision block 281), exit the information menu block 275 (decision block 282), an enlarged display of the design for viewing (decision block 283), or the opportunity to make design modifications of previously chosen selections (decision block 284).

If the user requests advice according to decision block 276, program control is transferred to processing block 286. Advice appropriate to the user's previously chosen selections will be displayed on video display device 140 in one or more pages. For example, had the user previously selected a curved layout with script lettering, advice might be given during the message text entry section concerning the use of upper/lower case lettering, the boldness of the lettering, and the length of the message lines that would create a readable message in the design. At any rate, advice is given that is based on previously chosen options that is appropriate to the current selection about which the user is deciding. Upon completion of processing block 286, control passes to processing block 274 and the information options in menu block 275 are redisplayed.

If the user request examples and further information according to decision block 277 in menu block 275, program control is transferred to processing block 287. Examples and information appropriate to the current selection will be displayed on video display device 140 in one or more pages. For example, if menu block 275 had been called during entry of text for the message (processing block 307), examples of designs with various styles of messages would be displayed for the user's perusal; if menu block 275 had been called during selection of a garment style, examples of the garments would be displayed along with information that would include price, usability, and garment characteristics of interest to the user. Upon completion of processing block 287, control passes to processing block 274 and the information options in menu block 275 are redisplayed.

If the user requests the current status according to decision 278 in menu block 275, program control is transferred to processing block 288. A status message along with help on how to proceed with the design appropriate to the current selection will be displayed on video display device 140 in one or more pages. For example, if menu block 275 had been called during entry of text for the message (processing block 307), a status message would indicate what selections the user has already completed, explain how the user may complete the current selection, and indicate what the next steps in the design process would involve. Upon completion of processing block 288, control passes to processing block 274 and the information options in menu block 275 are redisplayed.

If the user requests a design demonstration according to decision block 279 in menu block 275, program control is transferred to processing block 289. A design demonstration will be displayed on video display device 140 in one or more pages. For example, an interesting demonstration of one or more steps in the design process would be presented to give the user a brief overview of the design process. Upon completion of processing block 289, control passes to processing block 274 and the information options in menu block 275 are redisplayed.

If the user requests instructions according to decision block 280 in menu block 275, program control is transferred to processing block 290. Instructions will be displayed on video display device 140 in one or more pages. For example, instructions on how to use manual input device 130 or touch screen device 173 would be presented along with instructions on placing an order and messages of reassurance to the user. Upon completion of processing block 290, control passes to processing block 274 and the information options in menu block 275 are redisplayed.

If the user requests termination of the current design session according to decision block 281 in menu block 275, program control is transferred to the cycling demonstration in processing block 201.

If the user requests exit from the information options menu (menu block 275), program control returns to the local caller, one of menu blocks 302, 307, 312, 317, 322, 327, 333, 338, or 344.

If the user requests an enlarged display of the design according to decision block 283 in menu block 275, program control passes to processing block 262, where the executed instructions and program control are described above.

If the user requests to make design changes according to decision block 284 in menu block 275, program control passes to processing block 267, which is described above.

If the user has not responded to the prompts in menu block 275 during a specified time-out period, control passes to the cycling demonstration in processing block 201.

The user may also request to exit menu block 256 according to decision block 261. If the user chooses to do this, control passes back to the caller, one of menu blocks 302, 307, 312, 317, 322, 327, 333, 338, or 344. If the user has not responded to the prompts in menu block 256 during a specified time-out period, control passes to the cycling demonstration in processing block 201.

Subroutine 226 next enables specification of the particular message, in particular specification of the message for each of the selected lines (processing block 308). This specification of the particular message includes a limitation on the total number of characters which may be included in a particular line. This limitation varies based on factors including font, number of letters, font size, and layout, and the limitation is determined using the design rules residing in random access memory 123 in FIG. 1. In the preferred embodiment, four lines are available for text entry for straight or curved text, two lines for slanted text, and one line for circular text. During message text entry in menu block 307, the user may select one of the so-called global options rather than confirming the message entry according to decision block 309. In this case program control passes to menu block 256 where several alternatives are available and are described above. At any rate, the user exits menu block 256 according to decision block 261 and returns to message menu block 307. According to decision block 309, if the operator confirms the primary function of entering message text, then control passes to conflict decision block 310 where the selection is tested according to a predetermined set of design rules stored in non-volatile memory 160 that embody valid and aesthetically pleasing design descriptions. If the current selection is found to conflict with previous selections that the operator has made then control passes to processing block 291 where an appropiate warning is displayed. Typical conflicts in message text entry might include one or more of the following: too many lines entered for layout previously chosen, text lines too long for selected font and message entered, among others. Several options are then presented to the user according to menu selection 292. The workings of the conflict resolution have been described above. Upon completion of the conflict resolution subroutine 292, control returns to the local caller, in this case processing block 308. Once any conflict has been resolved to the satisfaction of the conflict resolution rules in decision block 310, processing block 311 uses the previously chosen selections along with suggested selections for selections not yet chosen and, in accordance with the design rules available in random access memory 123, creates a rendering of the design on video display device 140 for viewing at design illustration area 420. No repsonse is required from the user at this point, and control immediately passes to the next menu block, menu selection 312 in the preferred embodiment.

In the event that the artwork and message text are confirmed, then subroutine 226 prompts the user to select the design layout (processing block 313) in menu selection 312. The design layout indicates the particular relationship between the selected design elements including the positional relationships between the selected art and message text lines. In addition, this selection includes a selection of the relationship of the lines of text, if any, to the selected design element forming the art. Subroutine 226 automatically determines the selection of the number of lines of text to be included within the imprint design. In accordance with the preferred embodiment of the present invention in which the imprinted article is a garment such as a T-shirt, the number of lines could be zero, 1 or 2 lines above the graphic design and zero, 1 or 2 lines below the graphic design in the case where the operator desires a graphic design, or in the case where the operator desires no graphic design, 1, 2, 3, or 4 lines.

FIG. 4 illustrates menu selection display 400 for display via video display device 140 when selecting the arrangement of lines of text. Menu selection display 400 includes a plurality of samples 401 to 405 illustrating permitted combinations of text line arrangements relative to a central art element 410. FIG. 4 illustrates the permitted placement of the lines of text via bars. Each sample 401 to 405 includes one or more of these bars. In accordance with the menu selection display 400 illustrated in FIG. 4, the operator may select from six choices. Samples 401 and 402 each include a semicircular bar indicating text disposed in a semicircular arc above the selected design element. Similarly samples 401 and 403 includes a pair of horizontally disposed lines of text below the selected design element. Sample 403 includes only horizontally disposed lines of text. Sample 402 includes a pair of curved lines above and a pair of curved lines below. Sample 404 includes text circling the central art element. Sample 405 includes two slanted lines.

The desired selection is made in accordance with the preferred embodiment of the present invention by touching the desired pattern. As explained above, the preferred embodiment includes touch screen device 173. Touching the screen of video display device 140 in the region of one of the samples 401 to 405 selects that sample. Although FIG. 4 illustrates six particular selections, the present invention is not limited to these particular choices. More or fewer choices of the same type are feasible. The size of the screen is the only limit to the number of choices which can be presented simultaneously. In addition, further screens of the type illustrated in FIG. 4 can be employed. These further screens could be made accessible via a further prompt area 406 together with appropriate programming in response to such a manual input.

During layout selection in menu block 312, the user may select one of the so-called global options rather than confirming the layout selection according to decision block 314. In this case program control passes to menu block 256 where several alternatives are available and are described above. At any rate, the user exits menu block 256 according to decision block 261 and returns to layout memu block 312. According to decision block 314, if the operator selects one of the primary layout choices, then control passes to the conflict decision block 315 where the selection is tested according to a predetermined set of design rules stored in non-volatile memory 160 that embody valid and aesthetically pleasing design descriptions. If the current selection is found to conflict with previous selections that the operator has made then control passes to processing block 291 where an appropriate warning is displayed. Typical conflicts in choosing a layout might include one or more of the following: too many message lines previously entered for layout when slant or circular layout chosen, chosen, text lines too long for selected layout, or a slant layout chosen to be placed in the same location as previously chosen artwork, among others. Several options are then presented to the user according to menu selection 292. The workings of the conflict resolution have been described above, and upon completion of the conflict resolution subroutine, control returns to the local caller, in this case processing block 313. Once any conflict has been resolved to the satisfaction of the conflict resolution rules in decision block 315, processing block 316 uses the previously chosen selections along with suggested selections for selections not yet chosen and, in accordance with the design rules stored in random access memory 123, creates a rendering of the design on video display device 140 for viewing at design illustration area 420. No response is required from the user at this point, and control immediately passes to the next menu block, menu selection 317 in the preferred embodiment.

Figure 5A:
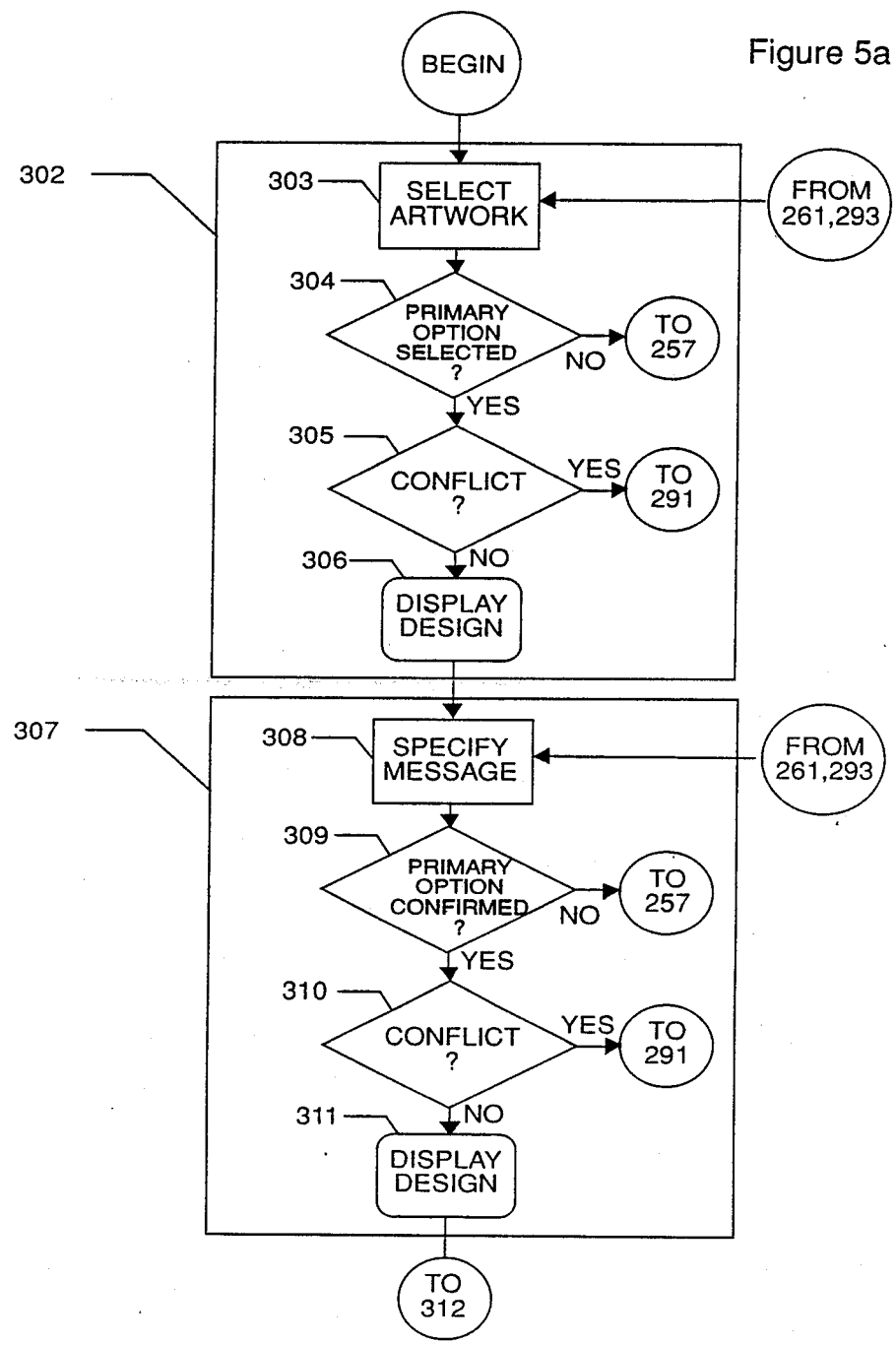
FIGS. 5a, 5b, 5c and 5d are a flow chart illustrating in detail the garment design subroutine.
Figure 5B:
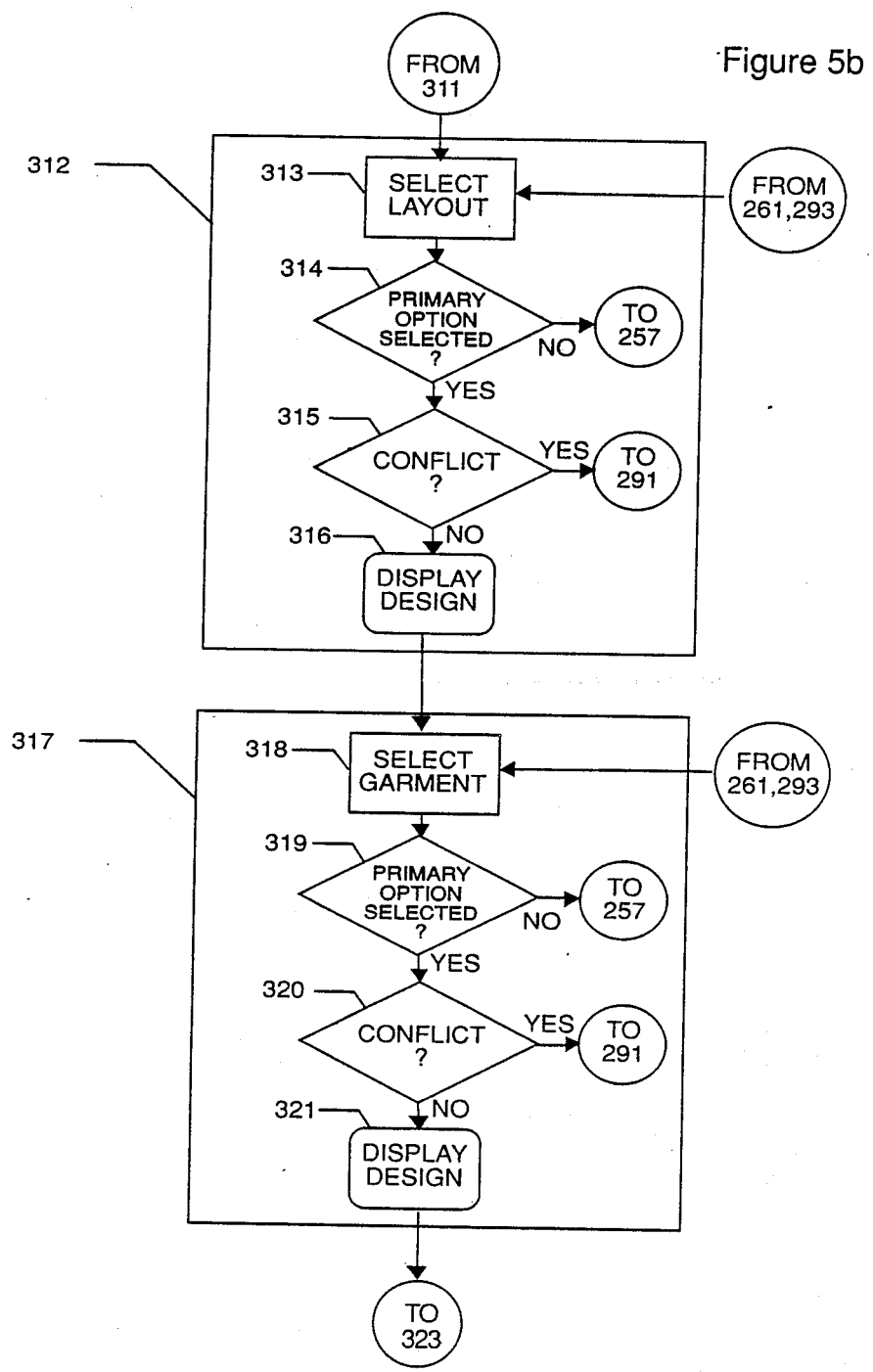
Figure 5C:
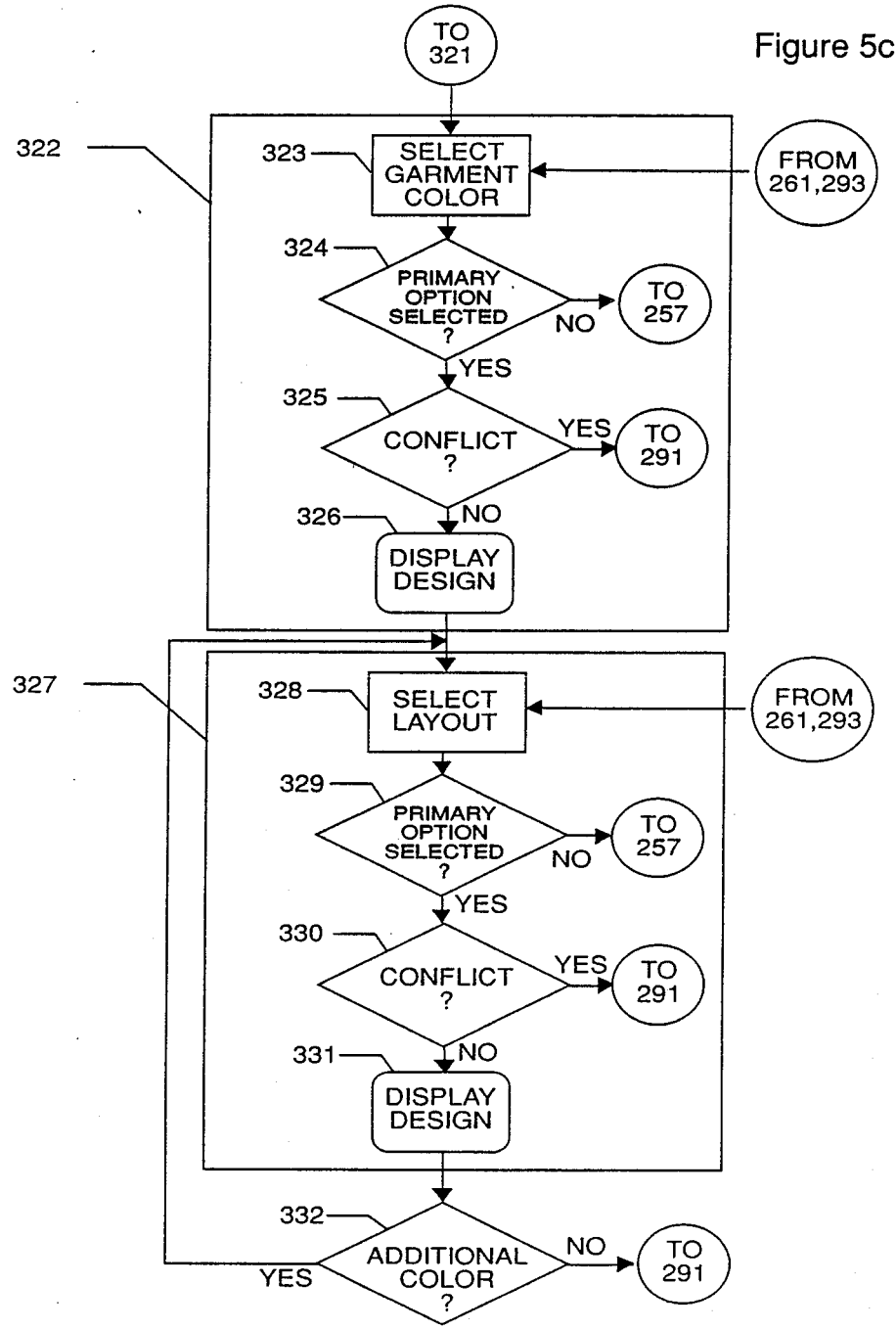
Figure 5D:
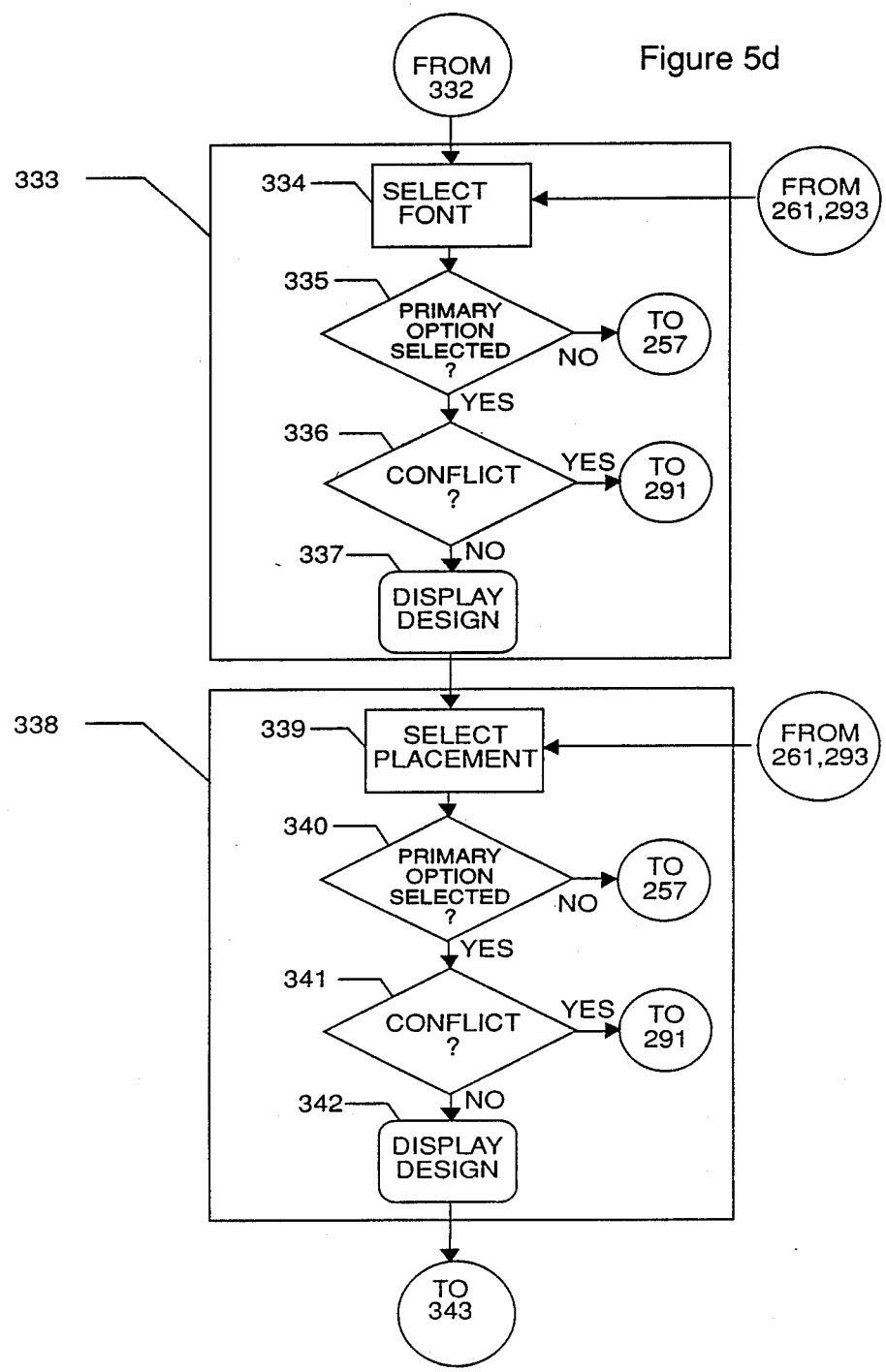
Figure 5E:
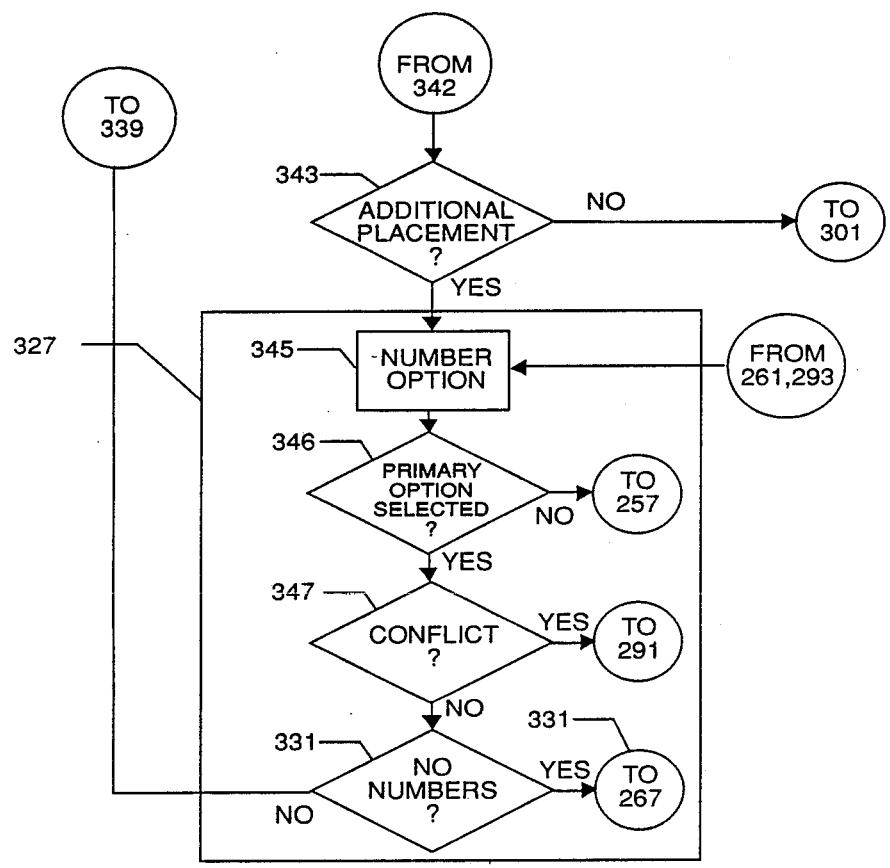

Next, central processing unit 110 presents the operator with a number of choices for the garment style (processing block 318) in menu selection 317 in FIG. 5b. The operator is prompted to select the type of garments. In accordance with the preferred embodiment, the type of garment is a shirt and may be either a long sleeve T-shirt, a short sleeve T-shirt, a sweat shirt, a baseball jersey, a soccer jersey, or a football jersey. It is envisioned that this system could also be used for other types of imprinted clothing such as caps, shorts, sleeveless T-shirts, tank tops and sweat pants. In addition, the system of the present invention is also applicable to types of imprinted articles other than garments.

During garment style selection in menu block 317, the user may select one of the global options rather than confirming the garment style selection according to decision block 319. In this case program control passes to menu block 256 where several alternatives are available and are described above. At any rate, the user exits menu block 256 according to decision block 261 and returns to garment style menu block 317. According to decision block 319, if the operator selects one of the primary garment style choices, then control passes to the conflict decision block 320 where the selection is tested according to a predetermined set of design rules stored in non-volatile memory 160 that embody the valid design descriptions. If the current selection is found to conflict with previous selections that the operator has made then control passes to processing block 291 where an appropriate warning is displayed. Typical conflicts in choosing a garment style includes the possibility that the garment style is not available with previously selected garment color, among others. Several options are then presented to the user according to menu selection 292. The workings of the conflict resolution have been described above. Upon completion of the conflict resolution subroutine, control returns to the local caller, in this case processing block 318. Once any conflict has been resolved to the satisfaction of the conflict resolution rules in decision block 320, processing block 321 uses the previously chosen selections along with suggested selections for selections not yet chosen and, in accordance with the design rules stored in random access memory 123, creates a rendering of the design on video display device 140 for viewing at design illustration are 420. No response is required from the user at this point, and control immediately passes to the next menu block, menu selection 322 in the preferred embodiment.

The user is next prompted to select the garment color (processing block 323) in menu selection 322. The particular available colors that match the selected garment style are stored in non-volatile memory 160. Design terminal 100 enables the user to select from among this set of available colors for the particular style selected and the particular color desired. In this regard, some articles such as baseball jerseys may include two colors. In such an event the user is prompted to select both colors, whether the colors can be selected independently or the colors are employed in predetermined combinations.

During garment color selection in menu block 322, the user may select one of the global options rather than confirming the garment color selection according to decision block 324. In this case program control passes to menu block 256 where several alternatives are available and are described above. The user eventually exits menu block 256 according to decision block 261 and returns to garment color menu block 322. According to decision block 324, if the operator selects one of the primary garment color choices, then control passes to the conflict decision block 325 where the selection is tested according to a predetermined set of design rules stored in non-volatile memory 160 that embody the valid design descriptions. If the current selection is found to conflict with previous selections that the operator has made then control passes to processing block 291 where an appropriate warning is displayed. Typical conflicts in choosing a garment color includes one or more of the following: garment style not available in currently selected garment color, garment color is the same color as or conflicts with the ink color, garment color selected creates an undesirable reverse image effect, among others. Several options are then presented to the user according to menu selection 292. The workings of the conflict resolution have been described above, and upon completion of the conflict resolution subroutine, control returns to the local caller, in this case processing block 323. Once any conflict has been resolved to the satisfaction of the conflict resolution rules in decision block 325, processing block 326 uses the previously chosen selections along with suggested selections for selections not yet chosen and, in accordance with the design rules stored in random access memory 123, creates a rendering of the design on video display device 140 for viewing at design illustration are 420. No response is required from the user at this point, and control immediately passes to the next menu block, menu selection 327 in the preferred embodiment.

The user is next prompted to select the ink color for the imprint (processing block 328) in menu selection 327. In accordance with a preferred embodiment of the present invention, certain garment color and ink color combinations are not permitted. In this regard, either the predetermined ink colors presented to the user for selection in processing block 328 include only those colors which are compatible with the previously selected garment color, or all possible ink colors for all garment colors are presented to the user and the interactive design terminal 100 warns the user of selection of an unpermitted combination.

During ink color selection in menu block 327, the user may select one of the global options rather than confirming the ink color selection according to decision block 329. In this case program control passes to menu block 256 where several alternatives are available and are described above. The user exits menu block 256 according to decision block 261 and returns to ink color menu block 327. According to decision block 329, if the operator selects one of the primary ink color choices, then control passes to the conflict decision block 329 where the selection is tested according to a predetermined set of design rules stored in non-volatile memory 160 that embody the valid design descriptions. If the current selection is found to conflict with previous selections that the operator has made then control passes to processing block 291 where an appropriate warning is displayed. Typical conflicts in choosing a ink color includes one or more of the following: garment color is the same color as or conflicts with the ink color, ink color selected creates an undesirable reverse image effect, or the ink color conflicts with or is the same color as other ink colors for those implementations that allow multi-color design work, among others. Several options are then presented to the user according to menu selection 292. The workings of the conflict resolution have been described above, and upon completion of the conflict resolution subroutine, control returns to the local caller, in this case processing block 328. Once any conflict has been resolved to the satisfaction of the conflict resolution rules in decision block 330, processing block 331 uses the previously chosen selections along with suggested selections for selections not yet chosen and, in accordance with the design rules stored in random access memory 123, creates a rendering of the design on video display device 140 for viewing at design illustration area 420. No response is required from the user at this point, and control immediately passes to decision block 332 in the preferred embodiment.

For implementations that require multi-color design work, decision block 332 will allow the operator to include additional colors. In this case, program control returns to processing block 328 in menu selection 327 and appropriate selections for additional colors are displayed according to the above description for menu selection 322. If multi-color design work is not required or allowed, or the user chooses to have a single color design or has chosen all the available multi-color selections according to decision block 332, then control passes to the next menu block, menu selection 333 in the preferred embodiment.

Once the garment style and color along with ink color is specified in the preferred embodiment, subroutine 226 permits the user to select a particular font, or type face, for any imprinted text to be included in the design (processing block 334) in menu selection 333. In this regard, the non-volatile memory 160 can store data corresponding to a plurality of differing typeface fonts. These can be presented to the user by central processing unit 110 via video display 140, enabling the user to see the particular type of fonts to be selected. The user is prompted to make a selection of font such as: plain, shadow, outline, block, script, italic, old English, or bold, among others. For implementations that include many fonts and styles not possible to display on video display unit 140 simultaneously, one or more levels of selections would be presented organized according to type face, type style, or other logical categorization.

During font selection in menu block 333, the user may select one of the global options rather than confirming the font selection according to decision block 335. In this case program control passes to menu block 256 where several alternatives are available and are described above. Eventually the user exits menu block 256 according to decision block 261 and returns to font menu block 333. According to decision block 335, if the operator selects one of the primary font choices, then control passes to the conflict decision block 335 where the selection is tested according to a predetermined set of design rules that embody the valid design descriptions. If the current selection is found to conflict with previous selections that the operator has made then control passes to processing block 291 where an appropriate warning is displayed. Typical conflicts in choosing a font include one or more of the following: font chosen creates a message line too long to be displayed correctly in the design, among others. Several options are then presented to the user according to menu selection 292. The workings of the conflict resolution have been described above, and upon completion of the conflict resolution subroutine, control returns to the local caller, in this case processing block 334. Once any conflict has been resolved to the satisfaction of the conflict resolution rules in decision block 336, processing block 337 uses the previously chosen selections along with suggested selections for selections not yet chosen and, in accordance with the design rules stored in random access memory 123, creates a rendering of the design on video display device 140 for viewing at design illustration area 420. No response is required from the user at this point, and control immediately passes to the next menu block, menu selection 338 in the preferred embodiment.

This is followed by selection of the design placement (processing block 339) in menu selection 338. In accordance with the preferred embodiment in which the imprinted article is a garment such as a T-shirt, the design placement may be either in a full front position, a full back position, or a front heart position. The front heart position requires a somewhat smaller overall design than that of the full front or full rear positions.

During placement selection in menu selection 338, the user may select one of the global options rather than confirming the placement selection according to decision block 340. In this case program control passes to menu block 256 where several alternatives are available and are described above. The user eventually exits menu block 256 according to decision block 261 and returns to placement menu selection 338. According to decision block 340, if the operator selects one of the primary placement choices, then control passes to the conflict decision block 340 where the selection is tested according to a predetermined set of design rules that embody the valid design descriptions. If the current selection is found to conflict with previous selections that the operator has made then control passes to processing block 291 where an appropriate warning is displayed. Typical conflicts in choosing a placement include one or more of the following: placement has already been chosen for use by another design on the same garment, among others. Several options are then presented to the user according to menu selection 292. The workings of the conflict resolution have been described above, and upon completion of the conflict resolution subroutine, control returns to the local caller, in this case processing block 339. Once any conflict has been resolved to the satisfaction of the conflict resolution rules in decision block 341, processing block 342 uses the previously chosen selections along with suggested selections for selections not yet chosen and, in accordance with the design rules stored in random access memory 123, creates a rendering of the design on video display device 140 for viewing at design illustration area 420. No response is required from the user at this point, and control immediately passes to the decision block 343 in the preferred embodiment.

For implementations that require multi-placement design work on the same garment item, decision block 343 will allow the operator to include additional designs and placements. In this case, program control returns to 301 which is the starting point for selecting an entire set of design selections for another design. If multi-placement design work is not required or allowed, or the user chooses to have a single design or has chosen all the multi-placement selections according to decision block 343, then control passes to the next menu block, menu decision 344 in the preferred embodiment.

Next, subroutine 226 enables the operator to select a number option (processing block 345) in menu selection 344. Because it is expected that the garments in accordance with the preferred embodiment of the present invention will often be used by athletic teams, a number option is provided. The user can specify the position of the numbers, front only, back only, front and back, or on the sleeve, and can also select the particular numbers to be employed.

During number selection in menu decision 344, the user may select one of the global options rather than confirming the number option selection according to decision block 346. In this case program control passes to menu block 256 where several alternatives are available and are described above. At any rate, the user exits menu block 256 according to decision block 261 and returns to number option menu decision 344. According to decision block 346, if the operator selects one of the primary number option choices, then control passes to the conflict decision block 346 where the selection is tested according to a predetermined set of design rules stored in that embody the valid design descriptions. If the current selection is found to conflict with previous selections that the operator has made then control passes to processing block 291 where an appropriate warning is displayed. Several options are then presented to the user according to menu selection 292. The workings of the conflict resolution have been described above, and upon completion of the conflict resolution subroutine, control returns to the local caller, in this case processing block 345. Once any conflict has been resolved to the satisfaction of the conflict resolution rules in decision block 347, decision block 348 determines whether a placement needs to be chosen for the numbers option. If numbers have been selected, control passes to processing block 339 and a placement is selected according the menu selection 338 described above. If no numbers are desired according to decision block 348, the numbers option is completed for the moment. Note that during order placement individual numbers need to be specified and included in the order form information.

This typically completes the garment design specification of processing block 226.

Referring back to FIGS. 3a, 3b and 3c, upon completion of a garment design as specified in processing block 226, or upon recall of the similarly captured data from a previous order in processing block 225, program 200 displays the selections made by the operator (processing block 227). These selections are displayed in one or more screens indicating to the user the particular detailed imprint design specification previously selected. Program 200 next enables the user to confirm the displayed selections (decision block 228). This confirmation is envisioned to take place by presenting a screen on video display 140 that indicates the particular selections made by the user and a prompt asking the user to answer whether or not these selections are what is desired. If the user decides not to confirm the selections, and chooses a particular selection to modify according to decision block 269 then control of subroutine 226 returns to the appropriate menu block that includes one or more of 302, 307, 312, 317, 322, 328, 333, 338 or 344, thereby repeating the previously made selections. In such an event, it is envisioned that the previously made selection is employed as a default, whereby the user can select the previously made selection in one of the processing blocks listed above by default. The program continues if these selections are confirmed.

If the selections are confirmed, then central processing unit 110 prints an indication of the selected imprint design via printer port 150 and printer 151 or 152 (processing block 229). This printout may also include data indicative of the particular user and an order number enabling the user to recall a specified imprint design. This data provides a hard copy for the user to take away from the interactive design terminal 100 which serves to supplement the memory of the user as to the particular imprint design selected.

Once the printout is completed the operator is prompted to input customer identification information (processing block 230), that normally includes name, address, and phone, among other useful reference information. This is accomplished by placing a representation of an entry form on video display device 140 and requesting the operator to fill in the blank fields in the form. The operator may confirm the information according to decision block 231, or return to processing block 230 to edit the entry form until acceptable. Once confirmed, the customer identification information and order number along with the set of selections from menu selections 302, 307, 312, 317, 322, 328, 333, 338, and 344 are stored on non-volatile memory device 160. Typically this information will remain stored for a period of 30 days or until recalled to allow users to recall previously entered data as described above (blocks 212, 222, 223, 224 and 225).

Program 200 then enters end menu 233. End menu 233 allows a plurality of selections to complete the particular session with interactive design terminal 100. Although end menu 233 is illustrated as a number of yes/no selections, in the preferred embodiment these selections are made from a plurality of possible choices in the manner previously described above in conjunction with menu 210.

The user is given the opportunity to make a further revision of the design (decision block 234). This further revision of the design may be called for upon study of the particular design indicated by the printout from processing block 229. If such a review is desired, control of program 200 returns to processing block 227 which displays the selections of the imprint design already made. Control of program 200 then proceeds as described above through the confirmation of the displayed selection (decision block 228), and either respecification of the garment imprinted article design (processing block 226) or a further printout of the design particulars (processing block 229).

In the event that a revision of the design is not required, the user can specify the printout of an order form (decision block 236). If an order form is desired, then program 200 displays price, quantity and size information and requests the input of garment size and quantity information for the order (processing block 245). If the user had selected the number option, then the specific numbers for the order must also be entered. The operator then may either confirm the order information (decision block 247) or quit without placing an order (decision block 248). If the operator chooses to quit, control passes back to the cycling demonstration (processing block 201).

If the order is confirmed, then the order form is printed out (decision block 249) by control of printer 151 from central processing unit 110. This order form includes an indication of the particular imprint design specified together with information regarding the available sizes and respective prices. It is not contemplated that the actual order will be placed at the interactive design terminal 100. Rather, the user would take the printed order form and pay a retail clerk for the particular sizes and quantities desired. As an alternative, the printed order form with the specification of desired sizes and quantities can be mailed to the firm producing the imprinted articles together with a form of payment. Once this order form has been printed, the additional size, quantity, and calculated price information is stored on non-volatile memory device 160 along with the information saved previously in processing block 232 described above. Menu selection 251 then is presented and allows the operator to select from one of the following: place another order (decision block 252) whereby control returns to end menu selection 233, make design changes (decision block 253) whereby control passes to processing block 267, or quit (decision block 254) whereby control passes to the cycling demonstration of processing block 201. If the operator has not responded during a specified time-out period (decision block 255), control passes to the cycling demonstration of processing block 201.

If the user does not desire an order form, menu selection 233 enables the selection of the printout of a sign-up sheet (decision block 235). Because the T-shirts of the preferred embodiment are ordinarily ordered by small groups such as athletic teams, it is considered desirable to enable particular individuals to specify their sizes, individual number, etc. Upon selection of the printout of a sign-up sheet, program 200 requests the input of additional customer information appropriate to a sign-up sheet such as a group name and what price the group members would be charged, if any (processing block 239). Processing blocks 239 through 242 operate in manner similar to processing blocks 245 through 248 previously described. Next, program 200 controls the printout of the sign-up sheet (processing block 243). This is achieved by central processing unit 110 controlling printer port 150 and printer 151 or 152 to print the sign-up sheet. The sign-up sheet would preferably include text identifying the particular selected design, including the colors and styles and the text selected, and provide a plurality of ordering lines enabling members of the group to include their name, the size desired and the quantity desired of the specified imprinted article. Once this sign-up sheet has been printed, the additional sign-up sheet information is stored on non-volatile memory device 160 along with the previously entered information in processing block 232. Then menu selection 251 is displayed where the operator can proceed as described above.

Menu selection 233 enables the user to quit the program (decision block 237). If the operator does not decide to quit the program, end menu 233 is repeated, enabling selection of any of the previously described options. In the event the user decides to quit the program, control returns to cycling demonstration 201 to again begin the program 200. As well, if the user fails to respond during a specified time-out period (decision block 238), control returns to the cycling demonstration.

It is possible for the imprint master employed to produce the imprint designed in accordance with the foregoing description to be made by hand. This would involve laying out an imprint master in accordance with the design selected by the user. This selected design could be communicated either by communications port 170 or via the transportation of a floppy disk produced by non-volatile memory 160.

Figure 11:
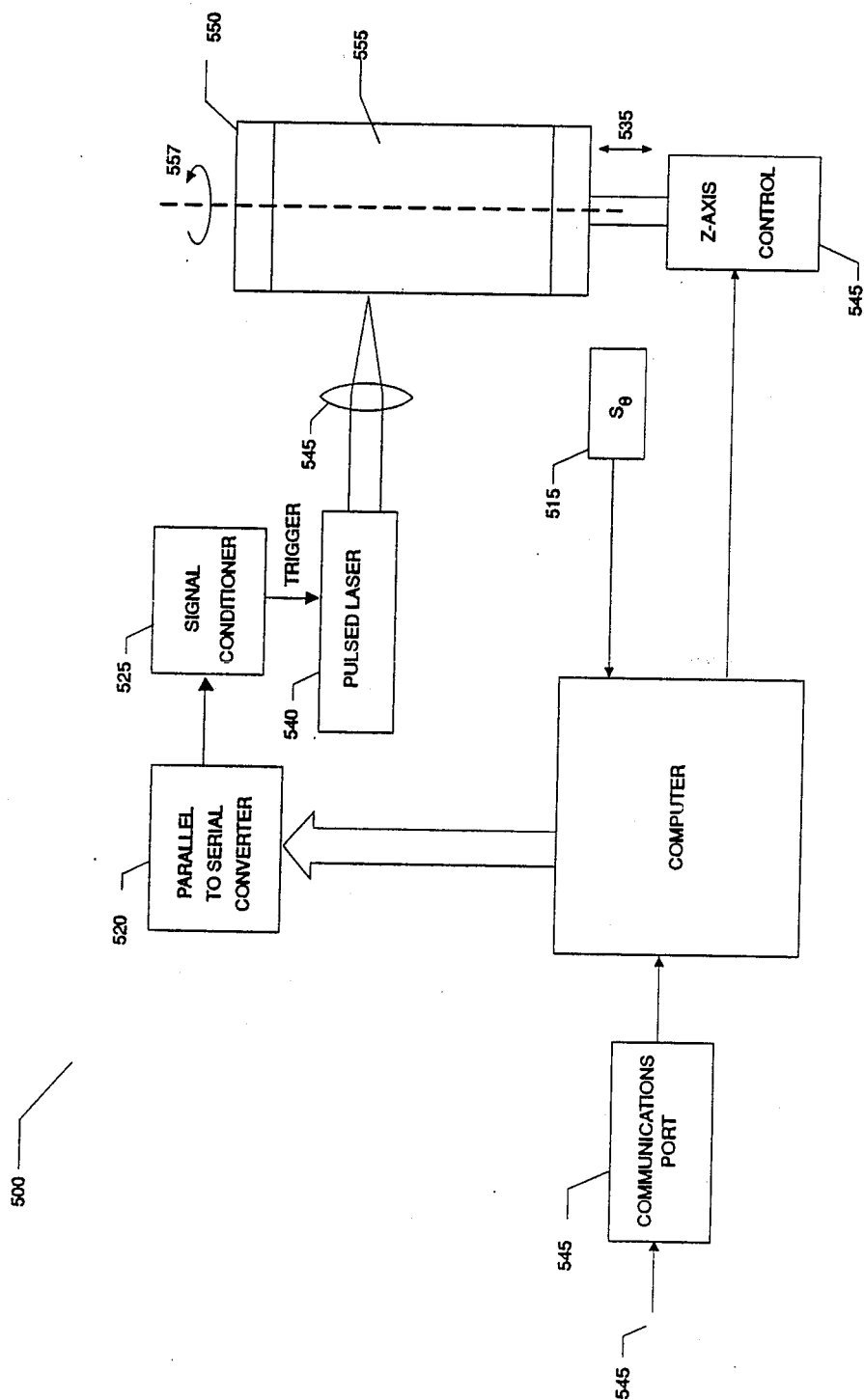
FIG. 11 is an illustration of an apparatus for automatically constructing master silk screens in accordance with the preferred embodiment of the present invention.

The preferred embodiment of the present invention includes some form of automatic generation of the imprint master for the custom imprinted article. FIG. 11 illustrates such a system employing a computer controlled pulsed laser. Laser imprint system 500 includes computer 510, communications port 505 coupled to communications line 501, parallel to serial converter 520, signal conditioner 525, pulsed laser 540, optical system 545, drum 550 including a mylar screen 555 to be formed into the silk screen, rotational sensor 515 and Z axis controller 530.

Laser imprint system 500 includes computer 510 which is in communication with the interactive design terminal 100 via communications port 505 and communications line 501. In accordance with the preferred embodiment, communications line 175 of interactive design terminal 100 is connected to communications line 501 of laser imprint system 500. The data corresponding to the selected design including the selected type of article, the selected art and the specified text are communicated from interactive design terminal 100 to laser imprint system 500 via this connection of communications line. Computer 510 operates to convert this specification of the custom imprint design into a silk screen design. In accordance with a technique known in the art, ink may be squeezed through a screen onto the article to be imprinted, which in accordance with the preferred embodiment of the present invention is a T-shirt. Computer 510 generates data corresponding to the places within the silk screen master where ink is to flow. This data is transmitted in a parallel form to a serial converter 520. Parallel to serial converter 520 generates a serial bit stream to signal conditioner 525. Signal conditioner 525 provides a triggering signal to pulse laser 540. The signal from signal conditioner 525 causes pulse laser 540 to generate a laser pulse at the desired times. The light output from pulse laser 540 is directed to optical system 545, shown here as a single lens but not limited thereto, to focus upon a particular spot on mylar sheet 555.

Laser imprint system 500 includes a rotating drum 550 which rotates in a direction 557 indicated in FIG. 11. Mounted upon rotating drum 550 is a mylar sheet 555. This mylar sheet will become the imprint master. The rotational position and speed of the rotating drum 550 is measured by angular position sensor 515. This data is supplied to computer 510. In addition, computer 510 controls the Z axis control 530 which causes rotating drum 550 to move along its axis illustrated schematically at 535. With the control of the Z axis coming from computer 510 and the angular position of the rotating drum 550 measured via angular position sensor 515, computer 510 calculates the particular position within mylar sheet 555 at which the output from pulse laser 540 would be focused for any particular time. If this is a position corresponding to an inked portion of the garment then computer 510 provides a signal to control signal conditioner 525 to trigger pulse laser 540. The laser illumination from pulse laser 540 burns a hole through mylar sheet 555, thereby positioning an outlet for ink to flow to the garment. If, on the other hand, this position is a position that is not to be inked then pulse laser 540 is not triggered and no hole is burned in mylar sheet 555. Computer 510 controls the operation of pulse laser 540 in order to cover the entire usable portion of mylar sheet 555. Once this is complete then mylar sheet 555 becomes the imprint master for a silk screen operation, In accordance with the preferred embodiment of the present invention the silk screen operation occurs in a semi-automated fashion as illustrated at imprint system 600 illustrated in FIG. 12. Imprint system 600 includes a pair of moving tables 610 and 620. Moving table 610 is adapted to receive the article to be imprinted at a loading station 613 and rotates in direction 611. Rotating table 620 is adapted to receive the silk screen masters at laoding/unloading station 625 and rotates in direction 621.

In operation, imprint system 600 rotates articles to be imprinted and the appropriate silk screens to silk screen station 630. The articles to be imprinted are loaded on laoding station 613 and then rotated to the position of silk screen station 630. At silk screen station 630 the ink is applied to the imprint master and hence to the article to be imprinted in accordance with the known techniques of silk screen generation. Meanwhile, the next article is being placed upon the next table which is now in the position of a loading station 613. After this article has been imprinted then the next article, newly loaded at loading station 613 is rotated into position for receiving the custom imprint. When the article is rotated to unloading station 615, it is unloaded and thereafter placed into a drying device to complete the custom imprint process. At any time in which a particular imprint master is complete then rotating table 620 is rotated bring the position of the new imprint master to the silk screen station 630. The old imprint master is unloaded from loading/unloading station 635 and the third following imprint master to be employed is loaded at this position. Thereafter, the next set of articles are imprinted using the imprint master newly rotated to silk screen station 630.

The manufacturing system disclosed above for providing automatic generation of the imprint master and automated imprinting of the particular articles, is believed to be especially adapted for use with the interactive terminal 100 described above.

We claim:

1. An interactive design terminal for custom imprinted articles comprising:
a design element memory having stored therein data repesenting a plurality of print design elements;
a design rules memory having stored therein a plurality of design rules regarding the placement and size of print design elements and the placement and size of accompanying text in a print design;
an input device for receiving operator inputs including input text;
a design memory for storing data corresponding to a selection of print elements, selected print design element locations for each print design element, selected accompanying text and selected accompanying text locations for said print design;
a video display device connected to said design memory for generating an operator perceivable display;
an order memory for storing data indicative of a selection of the number and type of articles to be imprinted;
an interactive interface means connected to said design element memory, said design rules memory, said input device, said design memory, said visual display device and said order memory, for presenting choices to an operator concerning the possible selection of print design elements, print design element locations, accompanying text and accompanying text locations in accordance with the design rules stored in said design rule memory, and the type and number of articles to be imprinted via said visual display.

receiving selections of print design elements, print design element locations, accompanying text, accompanying text locations, and the type and number of articles to be imprinted via said input device, storing said selected of print design elements, said selected corresponding print design element locations, said selected accompanying text and said selected corresponding accompanying text locations in said design memory, storing said selected type and number of articles to be imprinted in said order memory, and displaying an indication representing the print design including said selected print design elements, said selected corresponding print design element locations, said selected accompanying text and said selected corresponding accompanying text locations, and said selected type and number of articles to be imprinted via said video display device, whereby the operator can view said display of said selections and edit said selections via said input device.

2. The interactive design terminal for custom imprinted articles as claimed in claim 1, further comprising:

a printer connected to said interactive interface means; and wherein said interactive interface means further includes an order printing means for causing said printer to print an order form indicative of said selected print design elements, said selected corresponding print design locations, said selected accompanying text, said selected corresponding accompanying text locations and the available sizes of imprinted articles.

3. The interactive design terminal for custom imprinted articles as claimed in claim 1, wherein:

the article to be imprinted comprises a shirt; and said design rules stored in said design rule memory include a selection of permitted alternative positions of said selected print design element including at least a full front position, a front heart position and a full back position.

4. The interactive design terminal for custom imprinted articles as claimed in claim 3, wherein:

said design rules stored in said design rule memory include specification of a first size for the print design element when a full front position or a full back position is selected and a second size, smaller that said first size, when a front heart position is selected.

5. The interactive design terminal for custom imprinted articles as claimed in claim 1, wherein:

said design rules stored in said design rule memory include permitted alternatives for the relative placement of a single selected print design element and at least one line of accompanying text.

6. The interactive design terminal for custom imprinted articles as claimed in claim 5, wherein:

said design rules stored in said design rule memory includes a selection of permitted alternative positions of accompanying text including at least one line of accompanying text curved above said selected position of said selected print design element, and at least one line of accompanying text disposed horizontally below said selected position of said selected print design element.

7. The interactive design terminal for custom imprinted articles as claimed in claim 5, wherein:

said design rules stored in said design rule memory includes selection of permitted alternative positions of accompanying text including at least one line of accompanying text curved above said selected position of said print selected design element and at least one line of accompanying text curved below said selected position of said selected print design element.

8. The interactive design terminal for custom imprinted articles as claimed in claim 5, wherein:

said design rules stored in said design rule memory includes selection of permitted alternative positions of accompanying text including at least one line of accompanying text disposed horizontally above said selected position of said selected print design element and at least one line of accompanying text disposed horizontally below said selected position of said selected print design element.

9. The interactive design terminal for custom imprinted articles as claimed in claim 5, wherein:

said design rules stored in said design rule memory includes a selection of permitted alternative positions of accompanying text including one line of accompanying text disposed circularly about said selected location of said selected print design element.

10. the interactive design terminal for custom imprinted articles as claimed in claim 5, wherein:

said design rules stored in said design rule memory includes a selection of permitted alternative positions including at least one line of text disposed diagonally at said selected position when no print design element is selected.

11. The interactive design terminal for custom imprinted articles as claimed in claim 5, wherein:

said interactive interface means includes means for presenting choices to an operator for selection of one of a a plurality of fonts for said at least one line of accompanying text.

12. The interactive design terminal for custom imprinted articles as claimed in claim 5, wherein:

said design rules stored within said design rule memory permit a variable number of characters in said at least one line of accompanying text, and wherein said design rules further specify a size for each of said at least one line of accompanying text which is inversely proportional to the number of characters in that line of accompanying text.

13. The interactive design terminal for custom imprinted articles as claimed in claim 1, wherein:

said interactive interface means includes means for presenting choices to an operator for selection of an article to be imprinted including a sleeve T-shirt, a baseball jersey, a soccer jersey and a football jersey.

14. The interactive design terminal for custom imprinted articles as claimed in claim 1, wherein:

said interactive interface means includes means for presenting choices to an operator for selection of an article color.

15. The interactive design terminal for custom imprinted articles as claimed in claim 1, wherein:

said interactive interface means includes means for presenting choices to an operator for selection of an imprinting ink color.

16. The interactive design terminal for custom imprinted articles as claimed in calim 1, wherein:

said interactive interface means further includes means for displaying via said video display device a pictorial indication of the type of article to be imprinted, said selected print design elements, said selected print design element locations, and said selected corresponding accompanying text locations.

17. The interactive design terminal for custom imprinted articles as claimed in claim 1, further comprising:

a communication device connected to said design memory and said order memory for transmitting a message corresponding to said selected print design elements, said selected locations and said selected number and type of articles to be imprinted;

an imprinting system connected to said communication device including an imprint master device for receiving said message and generating an imprint master for imprinting said selected articels corresponding to said selected print design elements at said selected locations within the imprinted article and said selected text according to said message, an article specification means for specifying particular articles corresponding to said number and type of articles selected according to said message, and an imprinting device for using said imprint master to imprint said specified articles.

18. An interactive design terminal for custom imprinted articles comprising:

a design element memory having stored therein data representing a plurality of print design ellements;

a design rules memory having stored therein a plurality of design rules regarding placement and size of print design elements;

an input device for receiving operator inputs;

a video display device for generating an operator perceivable display;

an interactive interface means connected to said design element memory, said design rules memory, said input device and said video display device for presenting choices to an operator via said video display means concerning the permitted selection of print design elements and print design element locations in accordance with said design rules stored in said design rule memory, receiving selections from an operator via said input device, and displaying to an operator via said video display means a pictorial display of said selections of print design elements and print design element locations, whereby the operator can view said display of said selections and edit said selections via said input device.

* * * * *

UNITED STATES PATENT AND TRADEMARK OFFICE
CERTIFICATE OF CORRECTION

PATENT NO.  : 4,873,643

DATED       : October 10, 1989

INVENTOR(S) : Powell et al.

Figure 12:
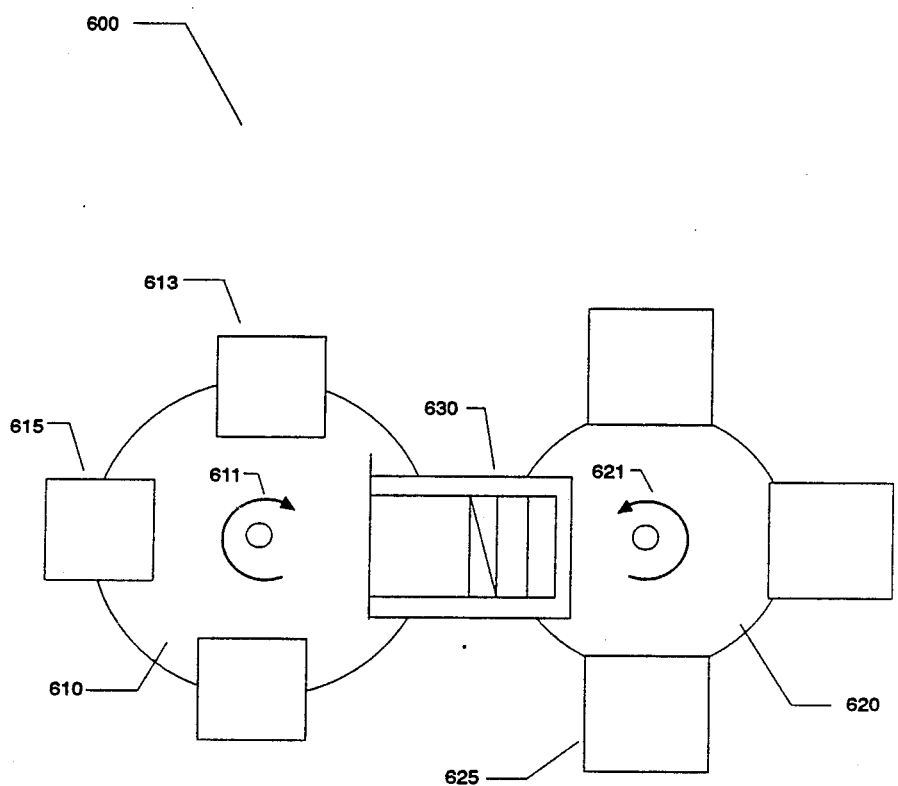
FIG. 12 illustrates the set up of a production line for imprinting articles in accordance with the custom imprint design produced by the interactive design terminal illustrated in FIG. 1.

It is certified that error appears in the above-identified patent and that said Letters Patent is hereby corrected as shown below:

In the Drawings, FIGURE 12 should appear as follows:

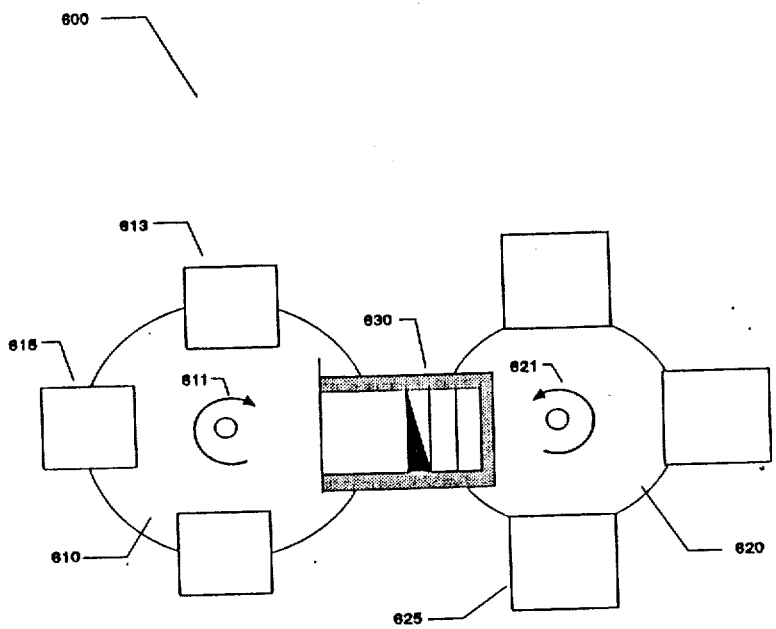

Figure 12

UNITED STATES PATENT AND TRADEMARK OFFICE
CERTIFICATE OF CORRECTION

PATENT NO. : 4,873,643

DATED : October 10, 1989

INVENTOR(S) : Powell et al.

It is certified that error appears in the above-identified patent and that said Letters Patent is hereby corrected as shown below:

Column 7, line 35, delete "detailed" and insert --detached--.

Column 8, line 27, delete "This" and insert --Thus--.

Column 12, line 45, delete "response" and insert --response--.

Column 13, line 42, delete "memu" and insert --menu--.

Column 22, line 4, delete "," and insert --.--.

Column 22, line 13, delete "laoding" and insert --loading--.

Column 22, line 18, delete "laoding" and insert --loading--.

Column 22, line 56, after "of print" insert --design--.

Column 25, line 27, delete "articels" and insert --articles--.

UNITED STATES PATENT AND TRADEMARK OFFICE
CERTIFICATE OF CORRECTION

PATENT NO. : 4,873,643

DATED : October 10. 1989

INVENTOR(S) : Powell, et al.

It is certified that error appears in the above-identified patent and that said Letters Patent is hereby corrected as shown below:

Column 26, line 8, delete "ellements" and insert --elements--.

Signed and Sealed this

Twelfth Day of March, 1991

*Attest:*

HARRY F. MANBECK, JR.

*Attesting Officer*     *Commissioner of Patents and Trademarks*